(12) United States Patent
Bailey et al.

(10) Patent No.: US 11,733,014 B2
(45) Date of Patent: Aug. 22, 2023

(54) MUNITIONS RACK WITH STRUCTURAL ELEMENT AND INSERTABLE EJECTORS

(71) Applicant: Vertex Aerospace LLC, Hewitt, TX (US)

(72) Inventors: Robert A. Bailey, Avon, IN (US); James T. Erdmann, Indianapolis, IN (US); Stephen A. Streib, Greenfield, IN (US); Armando Guerrero, Columbus, IN (US); Roy P. Mcmahon, Indianapolis, IN (US); Jessica R. Deherdt, Indianapolis, IN (US)

(73) Assignee: Vertex Aerospace LLC, Hewitt, TX (US)

( * ) Notice: Subject to any disclaimer, the term of this patent is extended or adjusted under 35 U.S.C. 154(b) by 0 days.

(21) Appl. No.: 17/328,107

(22) Filed: May 24, 2021

(65) Prior Publication Data

US 2022/0074722 A1    Mar. 10, 2022

Related U.S. Application Data

(62) Division of application No. 16/560,115, filed on Sep. 4, 2019, now Pat. No. 11,015,910.

(51) Int. Cl.
*B64D 1/04* (2006.01)
*F42B 39/28* (2006.01)
(Continued)

(52) U.S. Cl.
CPC ............... *F42B 39/28* (2013.01); *B64D 1/04* (2013.01); *B64D 7/08* (2013.01); *F41G 7/007* (2013.01)

(58) Field of Classification Search
CPC .. F42B 39/28; B64D 1/04; B64D 1/06; B64D 1/08; B64D 1/10; B64D 1/12; B64D 1/02;
(Continued)

(56) References Cited

U.S. PATENT DOCUMENTS

| 1,237,890 A | 8/1917 | Fernandez |
| 2,371,994 A | 3/1945 | Hojnowski |

(Continued)

FOREIGN PATENT DOCUMENTS

| EP | 1012820 | 6/2000 |
| WO | 2016/064457 | 4/2016 |

OTHER PUBLICATIONS

Korean Intellectual Property Office, Appl. KR 10-2022-7033466, Notice of Preliminary Rejection, dated May 22, 2023.

*Primary Examiner* — John Cooper
(74) *Attorney, Agent, or Firm* — Jones Day

(57) ABSTRACT

A munitions rack includes a munitions rack structure that houses multiple compact ejectors. The structure includes a pair of internal longitudinal ribs, inboard of a pair of external longitudinal ribs. A spine of the munitions rack structure links all the ribs, and the munitions rack structure may be formed out of a single piece of material. The ribs define a pair of side recesses on the port and starboard sides of the bomb, which each may be further subdivided into a forward pocket and an aft pocket. Removable ejectors are located in the pockets. The ejectors may receive pressurized gas from pressurized gas source(s) located outside of the ejectors. The ejectors may each have multiple forward pistons and multiple aft pistons. The ejectors may include pitch control valving to control the relative amounts of pressurized gas sent to the forward piston(s) and aft piston(s).

5 Claims, 13 Drawing Sheets

(51) Int. Cl.
   *B64D 7/08*       (2006.01)
   *F41G 7/00*       (2006.01)

(58) Field of Classification Search
   CPC ... B64D 7/00; B64D 7/02; B64D 7/06; B64D 7/08
   USPC ........... 89/1.57, 1.51, 1.53, 1.54, 1.56, 1.58, 89/1.59; 244/137.4, 118.1, 119, 131, 136, 244/137.1
   See application file for complete search history.

(56) References Cited

U.S. PATENT DOCUMENTS

| | | |
|---|---|---|
| 3,500,716 A | 3/1970 | Schnepfe et al. |
| 3,771,416 A | 11/1973 | Ackerman, Jr. et al. |
| 4,697,764 A | 10/1987 | Hardy et al. |
| 5,487,322 A | 1/1996 | Rhodes |
| 5,507,452 A | 4/1996 | Mayersak |
| 5,657,947 A | 8/1997 | Mayersak |
| 5,927,648 A | 7/1999 | Woodland |
| 6,254,031 B1 | 7/2001 | Mayersak |
| 8,292,220 B1 | 10/2012 | Westra et al. |
| 9,875,200 B2 | 1/2018 | Huber et al. |
| 9,916,277 B2 | 3/2018 | Hammel et al. |
| 2004/0094672 A1* | 5/2004 | Jakubowski, Jr. ....... B64D 1/06 244/137.4 |
| 2005/0204910 A1* | 9/2005 | Padan ..................... B64D 1/04 89/1.813 |
| 2006/0006288 A1* | 1/2006 | Jakubowski ............. B64D 1/04 244/137.4 |
| 2009/0100996 A1 | 4/2009 | Jakubowski, Jr. et al. |
| 2010/0070674 A1 | 3/2010 | Campbell |
| 2013/0221158 A1* | 8/2013 | Binkholder ............ F41F 3/065 89/1.51 |
| 2015/0210392 A1 | 7/2015 | Hodge et al. |
| 2016/0083089 A1* | 3/2016 | Ray .......................... F41F 3/06 244/137.4 |
| 2017/0259919 A1 | 9/2017 | Foster et al. |
| 2020/0200506 A1 | 6/2020 | Campbell et al. |

* cited by examiner

MUNITIONS RACK WITH STRUCTURAL ELEMENT AND INSERTABLE EJECTORS

This application is a divisional of U.S. application Ser. No. 16/560,115, filed Sep. 4, 2019, which claims priority to U.S. Provisional Application 62/727,621, filed Sep. 6, 2018, and to U.S. Provisional Application 62/726,524 filed Sep. 4, 2018. All of the above applications are incorporated by reference in their entireties.

GOVERNMENT LICENSE RIGHTS

This invention was made with government support under contract FA8672-13-C-0199 awarded by the United States Air Force. The government has certain rights in the invention.

FIELD OF THE INVENTION

The invention relates to racks for holding bombs, and/or other munitions or stores.

DESCRIPTION OF THE RELATED ART

Munitions racks are used to hold and release munitions or other stores. Such munitions racks, or bomb racks, may be mounted to aircraft in suitable locations. Part of the release process may involve forcibly pushing munitions away from the rack and from a device or platform upon which the munition is mounted, such as an aircraft. For example it may be desirable to eject a munition or store with sufficient force to have it separate quickly from the platform, and/or at a desired orientation.

Various applications use different launching platforms, such as an aircraft that includes a carriage or munitions rack for carrying, arming, and releasing a store, such as a munition, pod, fuel tank, or other ordnance. For example, military applications that use land vehicles, aircrafts, surface ships, or underwater vehicles may use stores in executing a mission. Conventional platforms include Operational Flight Programs (OFPs) that are used to perform the necessary functions for integrating and operating the mission store of the platform. For example, the platform can use a messaging protocol to control, monitor, and release the stores on the carriage racks. Adding or modifying a mission store interface typically requires a modification to the OFP which is typically costly. Additionally, given the increasing number of different platforms and mission stores, a conventional OFP may be overburdened with managing and handling many different interfaces.

SUMMARY OF THE INVENTION

A munitions rack or carriage has a ribbed structure that includes internal ribs that divide an interior of the structure into recesses. The structure may be a single piece.

A munitions rack has removable ejectors that fit into pockets in a structure.

A munitions rack has ejectors that each utilize multiple forward and multiple aft pistons that use compressed gas to push away a munition.

A munitions rack has ejectors that use compressed gas to push away a munition. A compressed gas source for an ejector is external to that ejector.

An ejector for a munitions rack has pitch control valving to control relative amounts of pressurized gas provided to one or more forward pistons and one or more aft pistons.

A munitions rack includes electronics/software enabling it to be agnostic with regard to the type of aircraft (platform) and type of munition or other store.

According to an aspect of the invention, a munitions rack includes: a munitions rack structure that includes a pair of longitudinal ribs defining a longitudinally-extending central recess and a pair of longitudinal-extending side recesses on opposite respective sides of the longitudinally-extending central recess, with the longitudinal ribs between the longitudinally-extending central recess and respective of the longitudinally-extending side recesses; and munitions ejectors; wherein multiple of the munitions ejectors are in each of the side recesses.

According to an embodiment of any paragraph(s) of this summary, the side recesses include a forward port pocket, a forward starboard pocket, an aft port pocket, and an aft starboard pocket.

According to an embodiment of any paragraph(s) of this summary, the ribs extend a majority of a length of the munitions rack.

According to an embodiment of any paragraph(s) of this summary, the ribs extend at least two-thirds of a length of the munitions rack According to an embodiment of any paragraph(s) of this summary, the ribs extend at least 90% of a length of the munitions rack structure.

According to an embodiment of any paragraph(s) of this summary, the munitions rack structure includes or more transverse bulkheads.

According to an embodiment of any paragraph(s) of this summary, the munitions rack structure is made of a single unitary continuous piece.

According to an embodiment of any paragraph(s) of this summary, the munitions rack structure is made of steel or aluminum.

According to an embodiment of any paragraph(s) of this summary, the longitudinal ribs are internal ribs.

According to an embodiment of any paragraph(s) of this summary, the munitions rack structure includes a pair of external ribs outboard of the internal ribs, with the external ribs being part of an external surface of the munitions rack.

According to an embodiment of any paragraph(s) of this summary, the munitions rack structure includes an access door that is openable to provide access to an external pneumatic energy connection of the munitions rack.

According to an embodiment of any paragraph(s) of this summary, the munitions rack structure has lug holes in a top surface.

According to an embodiment of any paragraph(s) of this summary, the munitions rack structure includes a top spine that links the ribs.

According to an embodiment of any paragraph(s) of this summary, the munitions rack further includes a cover plate that is secured to the munitions rack structure and covers the central recess and the side recesses of the munitions rack structure.

According to an embodiment of any paragraph(s) of this summary, the munitions ejectors are mechanically coupled to the munitions rack structures by removable fasteners passing through the munitions rack structure and into the munitions.

According to another aspect of the invention, a munitions rack includes: a munitions rack structure; multiple munitions ejectors insertable into and securable to the munitions rack structure; and one or more pressurized gas sources in the munitions rack structure and outside the munitions ejectors. The munitions ejectors each have a pressurized gas interface for receiving pressurized gas from the one or more pressurized gas sources, when the munitions ejectors are inserted into the munitions rack structure.

According to embodiment of any paragraph(s) of this summary, the one or more pressurized gas sources includes respective pressurized gas sources corresponding to individual of the munitions ejectors.

According to embodiment of any paragraph(s) of this summary, the munitions ejectors are covered by external lateral ribs of the munitions rack structure, with the external lateral ribs constituting parts of an outer skin of the munitions rack structure.

According to embodiment of any paragraph(s) of this summary, the external lateral ribs are linked by a spine of the munitions rack structure, with the spine being a top of the outer skin, and the external lateral ribs constituting opposite sides of the outer skin.

According to embodiment of any paragraph(s) of this summary, the munitions rack further includes an air compressor in the munitions rack structure, wherein the air compressor provides pressurized gas to the one or more pressurized gas sources.

According to embodiment of any paragraph(s) of this summary, the munitions rack structure includes a pair of longitudinal ribs defining a longitudinally-extending central recess and a pair of longitudinal-extending side recesses on opposite respective sides of the longitudinally-extending central recess, with the longitudinal ribs between the longitudinally-extending central recess and respective of the longitudinally-extending side recesses.

According to embodiment of any paragraph(s) of this summary, multiple of the munitions ejectors are in each of the side recesses.

According to yet another aspect of the invention, a munitions ejector for use in a munitions rack includes: a pressurized gas interface for receiving pressurized from a pressurized gas source that is external to the munitions ejector; and a manifold that distributes pressurized gas from the pressurized gas interface to multiple forward pistons that are used to push a forward ejector foot of the munitions ejector outward, and to multiple aft pistons that used to push an aft ejector foot of the munitions ejector outward.

According to embodiment of any paragraph(s) of this summary, the multiple forward pistons includes a pair of side-by-side forward pistons in a forward piston housing.

According to embodiment of any paragraph(s) of this summary, the multiple aft pistons includes a pair of side-by-side aft pistons in an aft piston housing.

According to still another aspect of the invention, a munitions ejector for use in a munitions rack includes: a pressurized gas interface for receiving pressurized from a pressurized gas source that is external to the munitions ejector; and a manifold that distributes pressurized gas from the pressurized gas interface to one or more forward pistons that are used to push a forward ejector foot of the munitions ejector outward, and to one or more aft pistons that used to push an aft ejector foot of the munitions ejector outward; wherein the manifold includes pitch control valving to control the relative amounts of pressurized gas distributed to the one or more forward pistons and the one or more aft pistons.

According to embodiment of any paragraph(s) of this summary, the pitch control valving includes: a forward pitch control valve for controlling flow of pressurized gas to the one or more forward pistons; and an aft pitch control valve for controlling flow of pressurized gas to the one or more aft pistons.

According to embodiment of any paragraph(s) of this summary, the forward pitch control valve has a through hole, with the forward pitch control valve rotated about an axis of the forward pitch control valve to control a degree of alignment between the through hole of the forward pitch control valve and a forward passage through which pressurized gas flows from the manifold to the one or more forward pistons.

According to embodiment of any paragraph(s) of this summary, the aft pitch control valve has a through hole, with the aft pitch control valve rotated about an axis of the aft pitch control valve to control a degree of alignment between the through hole of the aft pitch control valve and an aft passage through which pressurized gas flows from the manifold to the one or more aft pistons.

According to an aspect, a munitions rack includes: a munitions rack structure; multiple munitions ejectors insertable into and securable to the munitions rack structure; and an electronic control module for integrating a platform, different stores, and/or carriage racks, the electronic control module including: a processor communicatively couplable to each of the platform, the different stores, and/or the carriage racks; and a memory connected to the processor, wherein the memory contains a set of instructions for identifying a plurality of interfaces for predetermined platforms, stores, and carriage racks, and message sets that correspond to the predetermined platforms, stores, and carriage racks, wherein the processor is configured for executing the set of instructions to: identify a configuration of the platform, at least one store of the different stores and/or at least one carriage rack of the carriage racks to be integrated based; communicate different messages between the platform, the at least one store and/or the at least one carriage rack without affecting an Operational Flight Program (OFP) of the platform, wherein each communication between the platform, and the at least one store and/or the at least one carriage rack is independent; translate messages between the platform and the at least one store and/or the at least one carriage rack; and control operation of the at least one carriage rack and/or the at least one store based on the messages, wherein the electronic control module communicates with each of the platform, the at least one store and/or the at least one carriage rack via separate and independent busses.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

A munitions rack includes a munitions rack structure that houses multiple compact ejectors. The structure includes a pair of internal longitudinal ribs, inboard of a pair of external longitudinal ribs. A spine of the munitions rack structure links all of the ribs, and the munitions rack structure may be formed out of a single piece of material, as a titanium, aluminum, or steel. The ribs define a pair of side recesses on the port and starboard sides of the bomb, which each may be further subdivided into a forward pocket and an aft pocket. Removable ejectors are located in each of the pockets, providing an ability in one embodiment to secure four munitions to the munitions rack. The insertable ejectors may be covered by parts of the munitions rack structure, such as by parts of the external ribs that constitute part of the outer skin of the munitions rack.

The ejectors may receive pressurized gas from one or more pressurized gas sources located within the munitions rack outside of the ejectors. For example the munitions rack may have pressurized gas sources corresponding to respective of the ejectors, within a central recess of the munitions rack structure that is between the internal longitudinal ribs. The pressurized gas sources may be pneumatic sources. The ejectors have pressurized gas intake interfaces for receiving pressurized gas from the gas sources and routing the gas to pistons of the ejectors. The ejectors may each have multiple forward pistons and multiple aft pistons, to use space more efficiently within the ejectors, and to allow the ejectors to be more compact, while still providing a strong ejection force for separating munitions. The ejectors may include pitch control valving to control the relative amounts of pressurized gas sent to the forward piston(s) and aft piston(s) for any individual ejector, to selectively control the pitch at which the munitions are ejected.

Figure 1:
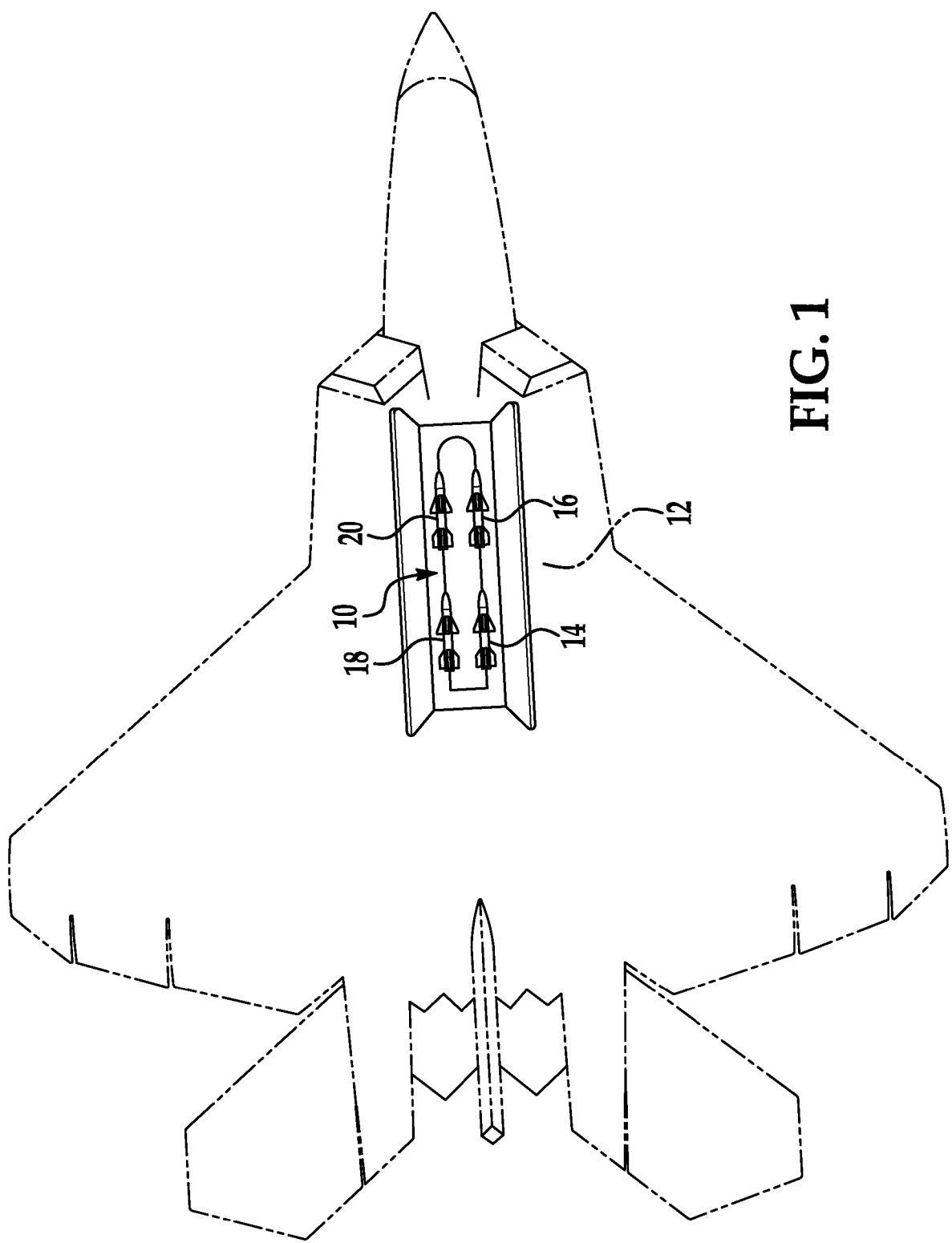
FIG. 1 is a schematic view of a munitions of rack according to an embodiment of the present invention.

FIG. 1 shows a munitions rack 10 that is attached to an aircraft 12, such as an airplane. The munitions rack 10 may be used to launch multiple munitions, such as munitions (or stores) 14, 16, 18, and 20. The munitions 14-20 may be any of a variety of suitable munitions or stores, such as bombs of various sorts, guided munitions such as smart bombs, missiles, and/or non-armaments such as fuel pods or supply containers. The munitions 14-20 may all be the same type of munition, or may vary in munition type, size, and/or other characteristics.

The munitions rack 10 may be mounted to the aircraft using standard mounts, such as using a MIL-STD-1760 and/or MIL-STD-1553 mounting/interface. The munitions rack 10 may be mounted in a bay of the aircraft 12, or alternatively may be mounted on a fuselage, wing, or other part of the aircraft 12.

FIGS. 2-7 show details of the munitions rack 10. A munitions rack structure 30 (FIGS. 2 and 3) serves as the main structure of the munitions rack 10, and constitutes most of an outer skin 32 of the munitions rack 10. As used herein, the term "outer skin" is used to broadly indicate an external portion of the munitions rack 10, where no moving or other functional parts of the munitions rack 10 are between the outer skin and an external surface that is in contact with air. The munitions rack structure 30 has a number of longitudinal ribs 34, 36, 38, and 40, connected to a spine 42 at the top of the munitions rack structure 30. The ribs 34-40 include internal ribs 36 and 38, and external ribs 34 and 40 that are outboard of (further from the munitions rack longitudinal centerline than) the internal ribs 36 and 38. The external ribs 34 and 40 provide the port and starboard portions of the munitions rack outer skin 32. The ribs 34-40 define a port side recess 44 between the port external rib 34 and the port internal rib 36, a central recess 46 between the internal ribs 36 and 38, and a starboard side recess 48 between the starboard internal rib 38 and the starboard external rib 40.

The ribs 34-40 may extend half or more than half of a longitudinal length of the munitions rack 10. For example the ribs 34-40 may extend over two-thirds of the total length munitions rack 10, and 90% or more of the length of the single-piece munitions rack structure 30.

The munitions rack structure 30 may be made of any suitable material, such as titanium, aluminum, or steel, and may be made as a single continuous piece, with the ribs 34-40 and the spine 42 all parts of a continuous integrallyformed piece of material. The ribs 34-40 may be formed by removing other parts of a larger pieces of material, such as by machining operations such as milling.

Figure 4:
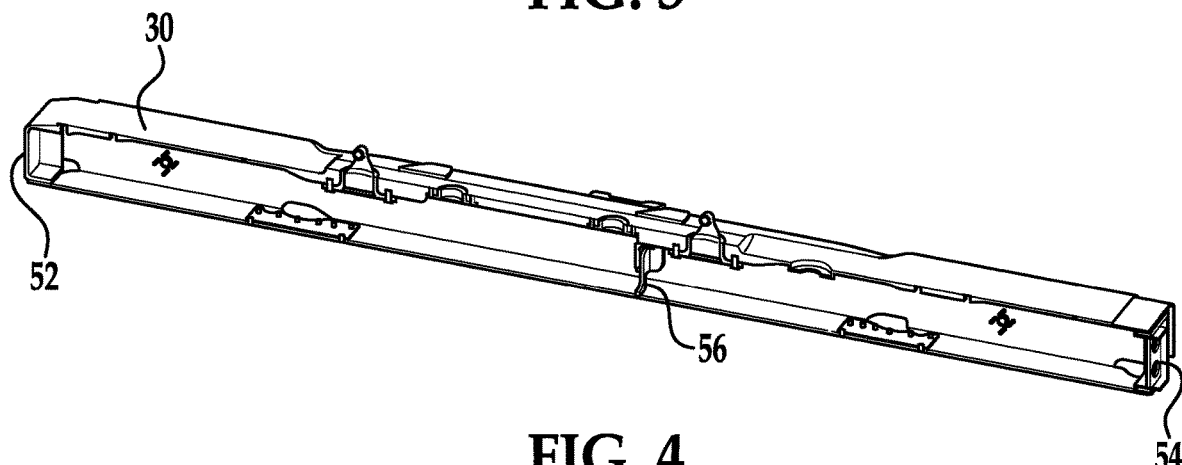
FIG. 4 is an oblique sectional view of the munitions rack structure of FIG. 2, with longitudinal bulkheads added.

Other pieces may be attached to and/or a part of the munitions rack structure 30. With reference in addition to FIG. 4, a front bulkhead 52 is attached to the forward end of the munitions rack structure 30, and an aft bulkhead 54 is attached a rear end of the munitions rack structure 30. A central bulkhead 56 strengthens the munitions rack structure 30 in a middle part of the munitions rack structure 30. The from bulkhead 52 and the aft bulkhead 54 may be separate pieces that cover the front and back ends respectively of the central recess 46. Openings in the bulkheads 52, 54, and/or 56 may allow passage of items therethrough, for example allowing cables or wire bundles to pass through.

Figure 5:
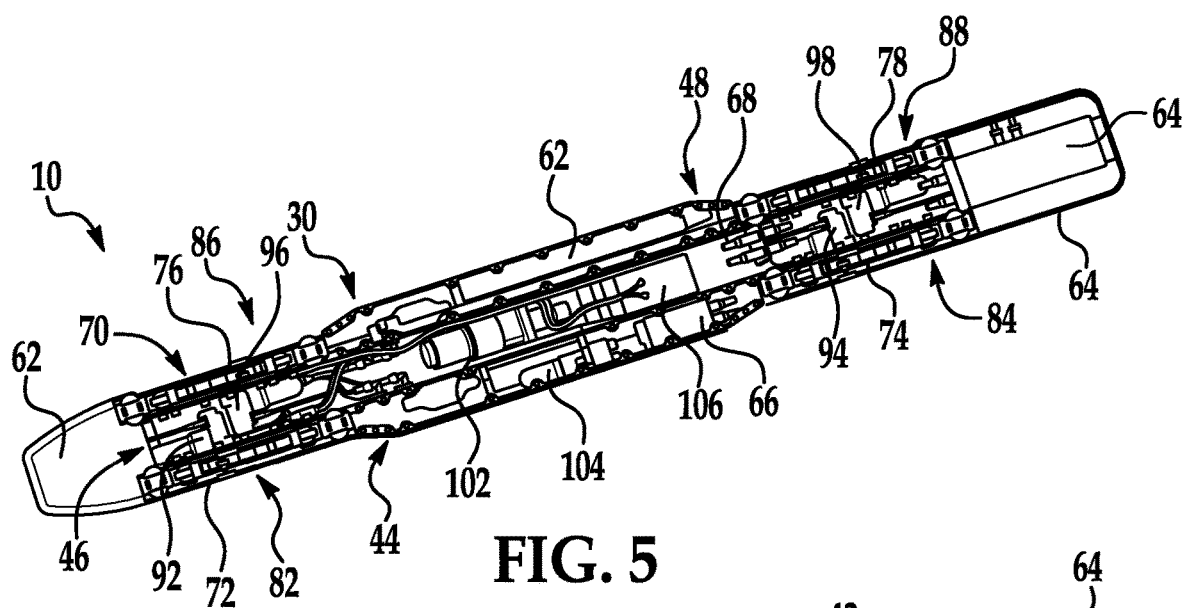
FIG. 5 is an oblique view of the munitions rack of FIG. 1, showing components on the underside of the rack.

Referring now in addition to FIG. 5, a forward fairing 62 may be attached to a front end of the munitions rack structure 30. An aft fairing 64 may be attached to a rear end of the munitions rack structure 30. Various components may be located in the recesses 44-48. Some of these components are shown in FIG. 5, including a power supply unit 62, system control electronics 64, a DC-DC converter 66, wiring harnesses 68, and various components of a pressurized gas system (stored energy system or SES) 70, used for providing force for extending feet of ejectors 72, 74, 76, and 78, which fit into (respectively) a forward port pocket 82, an aft port pocket 84, a forward starboard pocket 86, and an aft starboard pocket 88.

The pressurized gas system 70 includes pressurized gas sources 92, 94, 96, and 98, corresponding to and providing pressurized gas to the respective ejectors 72, 74, 76, and 78. The pressurized gas sources 92-98 may be pneumatic gas sources, each including an accumulator and suitable valving. Alternatively other sorts of pressurized gas sources, such as compressed gas cartridges, may be used instead. The pressurized gas system 70 also includes a compressor 102, a filter 104, and an electronic control unit 106 that controls filling of the gas sources 92-98. The compressor 102 may be powered by aircraft electric power to product compressed gas for supplying the pressurized gas sources 92-98.

Figure 2:
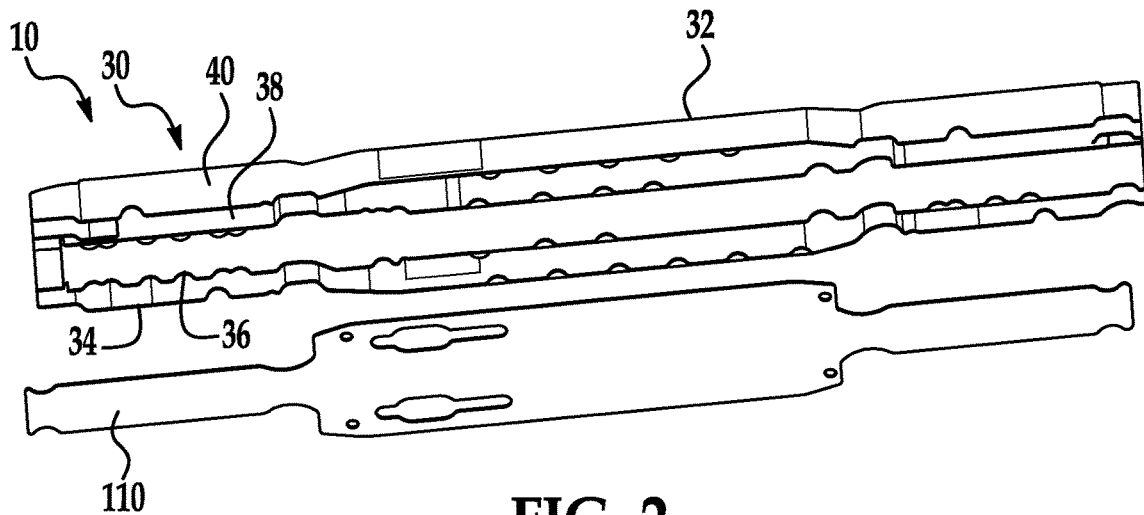
FIG. 2 is an exploded view showing a munitions rack structure and a closure plate, parts of the munitions rack of FIG. 1.
Figure 3:
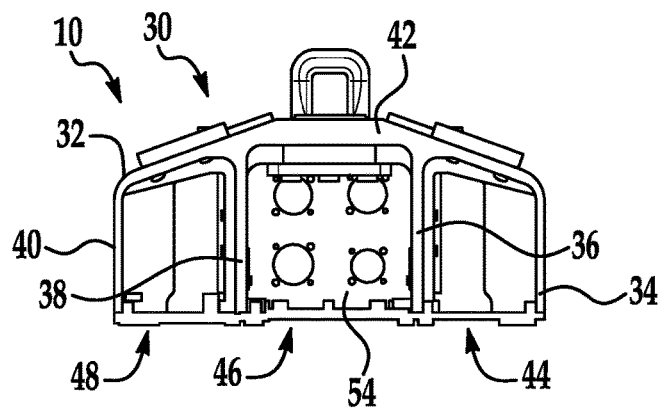
FIG. 3 is an end sectional view of the munitions rack structure of FIG. 2.

The open side of the munitions rack structure 30 may be covered by a closeout plate 110 (FIG. 2). The plate 110 may cover most of the components of the munitions rack 10, but may have openings to allow access to certain underlying areas of the munitions rack 10. For example the plate 110 may allow access to the pockets 82-88, to allow removal and installation of the modular ejectors 72-78.

The use of the ribs 34-40 (FIG. 3) and the bulkheads 52-56 (FIG. 4) in the structure of the munitions rack 10 provides a robust structure that resists twisting and bending. It is advantageous for the munitions rack 10 to have a robust structure that is able to withstand forces on it, for example from catapult launch of an aircraft that has the munitions rack 10. Many variations are possible, including the number and/or arrangement of the ribs and/or bulkheads.

Figure 6:
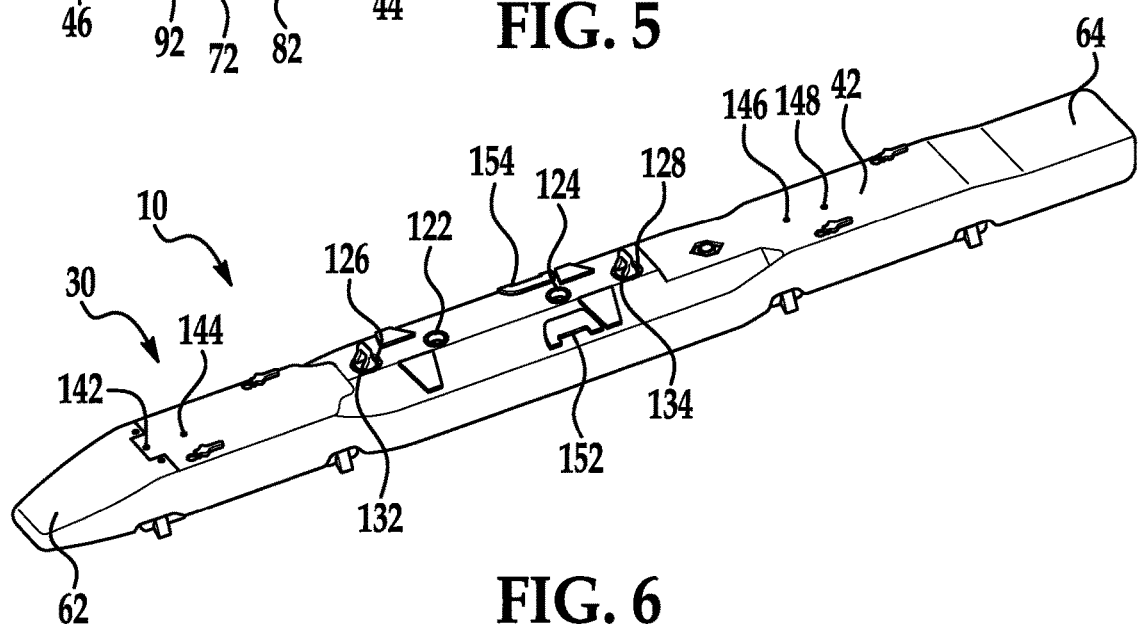
FIG. 6 is an oblique showing the top of the munitions rack of FIG. 5.

With reference to FIG. 6, the spine 42 has mounting points for mounting the munitions rack 10 to various sorts of structure, such as aircraft structure. The mounting points include two pairs of lug sleeves 122 and 124, and 126 and 128, for receiving suitable lugs, such as lugs 132 and 134, for engaging hooks at different spacings, for mounting the munitions rack 10. Example spacings are those provided for in MIL-STD-8591, with (14 inches) and (30 inches) between lug sleeves. The mounting points also include secondary strut mounting holes 142 and 144, and 146 and 148, and single hoist ordnance loading system (SHOLS) mountings 152 and 154.

Figure 7:
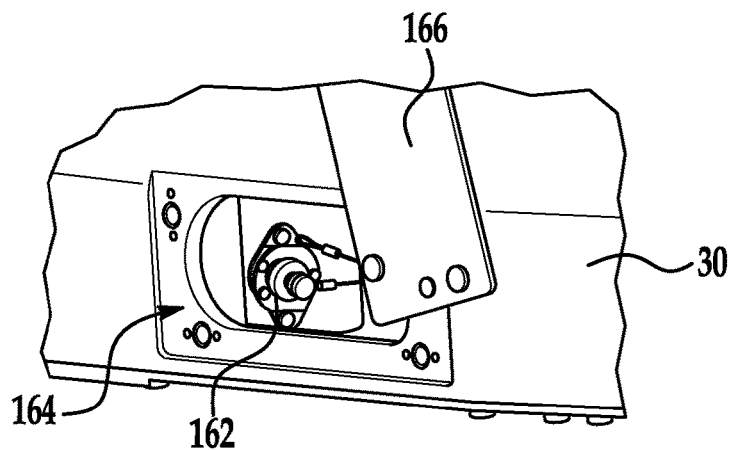
FIG. 7 is a magnified view showing a portion of the munitions rack of FIG. 5, showing an access door and an external pneumatic connection.

FIG. 7 shows another feature of the munitions rack 10, and more specifically of the munitions rack structure 30 and the pressurized gas system 70, an external pneumatic connection 162. The connection 162 that accessible through an opening 164 that is coverable by an access door 166.

Figure 8:
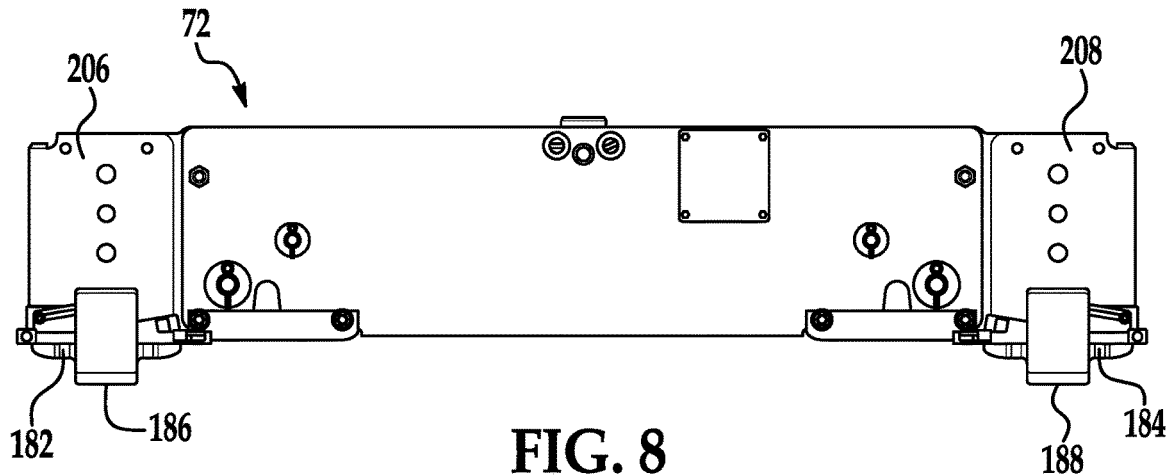
FIG. 8 is a side view of an ejector of the munitions rack of FIG. 5.
Figure 9:
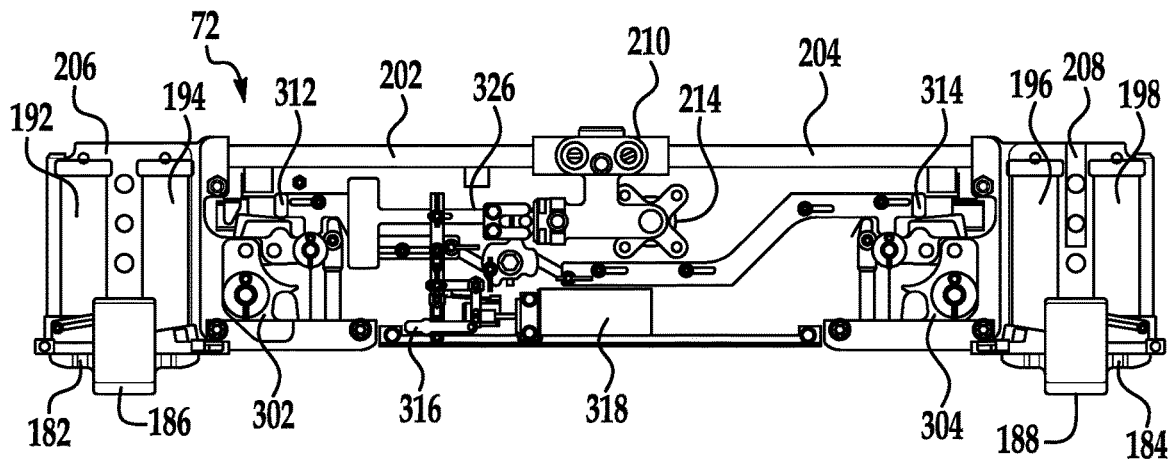
FIG. 9 is a side view showing the ejector of FIG. 8, with its housing removed.

FIGS. 8 and 9 show details of one of the ejectors, the ejector 72. The ejector 72 may have substantially the same configuration as the other ejectors 74, 76, and 78. The ejector 72 includes a forward pusher 182 and an aft pusher 184 that extend to push the munition (or store) 14 (FIG. 1) away from the munitions rack 10. The pushers 182 and 184 have respective feet 186 and 188 for contacting and engaging the munition 14.

The pushers 182 and 184 are actuated to push away the munition 14 (FIG. 1) by pairs of pressurized-gas-driven pistons 192/194, and 196/198, with the pistons 192 and 194 used to extend the pusher 182, and the pistons 196 and 198 used to extend the piston 184. The piston pairs 192/194 and 196/198 are side-by-side pairs of pistons. This arrangement allows for a more compact arrangement within the ejector 72, while providing sufficient force to achieve desired acceleration in the ejection of the munition 14.

Pressurized gas is delivered to the pistons 192-198 through tubing 202 and 204 that connects piston housings 206 and 208 to a manifold 210. The tubing 202 provides pressurized gas to the piston housing 206, and the tubing 204 provides pressurized gas to the piston housing 208. The manifold 210 in turn is connected to pressurized gas interface 214 that is configured to receive pressurized gas from a gas source external to the ejector 72, such as from the gas source 92 (FIG. 5). The interface 214 is not in the longitudinal center of the ejector 72, but is rather offset from the centerline. This allows the same configuration of ejector to be used in any of the pockets 82-88 (FIG. 5), while allowing more compact packaging of pressurized gas sources on either end of the munitions rack 10.

Figure 10:
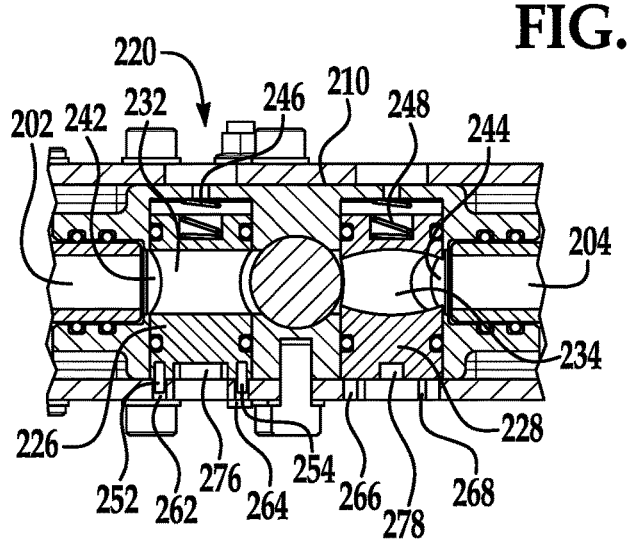
FIG. 10 is a side sectional view of valving of the ejector of FIG. 8.
Figure 11:
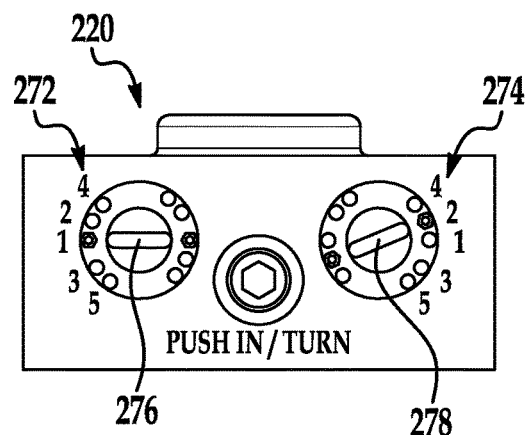
FIG. 11 is a side view showing settings of the valving of FIG. 10.

With reference now to FIGS. 10 and 11, the manifold 210 may include pitch control valving 220, for selectively controlling the relative amounts of pressurized gas sent to the piston pairs 192/194 (FIG. 9) and 196/198 (FIG. 9). The pitch control valving 220 includes a forward control valve 222 and an aft control valve 224. The control valves 222 and 224 include respective valve bodies 226 and 228 having respective through passages 232 and 234. The valve bodies 226 and/or 228 may be selectively rotated about their axes in order to control the alignment/disalignment of the through-passages 232 and 234 with respective flow passages 242 and 244 in the manifold 210, with the manifold flow passages 242 and 244 allowing flow into the respective tubes 202 and 204. To adjust the control valves 222 and 224 the valve bodies 226 and 228 may individually be pressed inward against spring pressure provided by springs 246 and 248, and then turned. The valve bodies 226 and 228 may have pins, such as pins 252 and 254, extending from them. The pins 252 and 254 may engage detents, such as detents 262, 264, 266, and 268, provided at certain locations within the manifold 210, to lock the valve bodies 226 and 228 in place at a number of predetermined positions, such positions indicated by the numbered scales 272 and 274 shown in FIG. 11. A screwdriver or other suitable tool (not shown) may be used to push in turn the valve bodies 226 and 228, with the tool engaging respective slots 276 and 278 in the valve bodies 226 and 228. Such adjustments may be made with the ejector 72 installed in the munitions rack structure 30 (FIG. 2), for example by inserting the tool through suitably-located holes in the munitions rack structure 30 to engage the slots 276 and 278.

By adjusting the control valves 222 and 224 the pitch of the munition 14 (FIG. 1) can be controlled as the munition is ejected from the munitions rack 10 (FIG. 1). Different relative gas flows between the forward pistons 192/194 (FIG. 9) and aft pistons 196/198 (FIG. 9) may be used for different sizes and/or types of munitions, and to achieve different amounts of pitch for a given munition.

Figure 12:
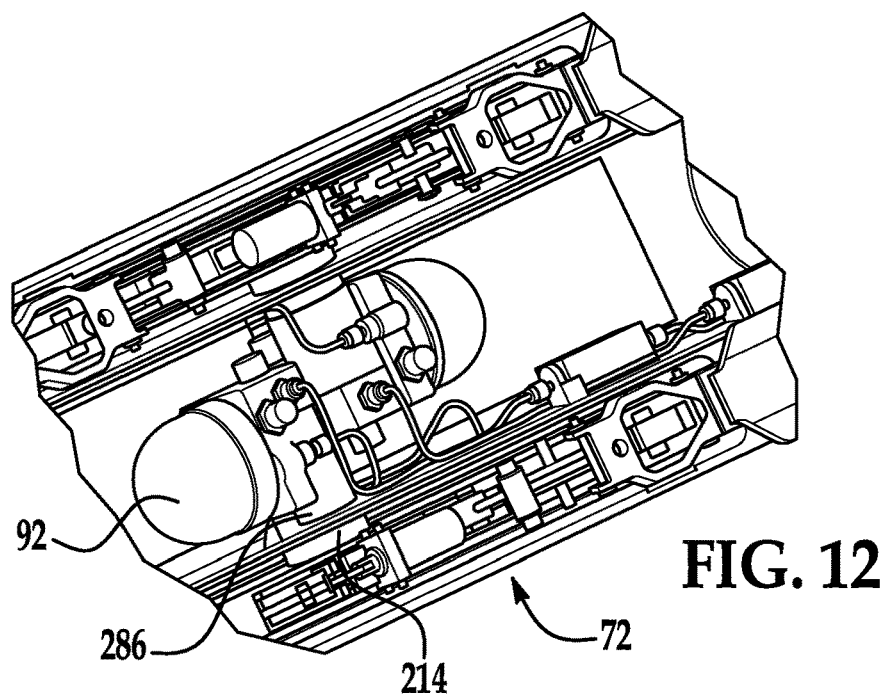
FIG. 12 is an oblique view of a portion of the munitions rack of FIG. 5.
Figure 13:
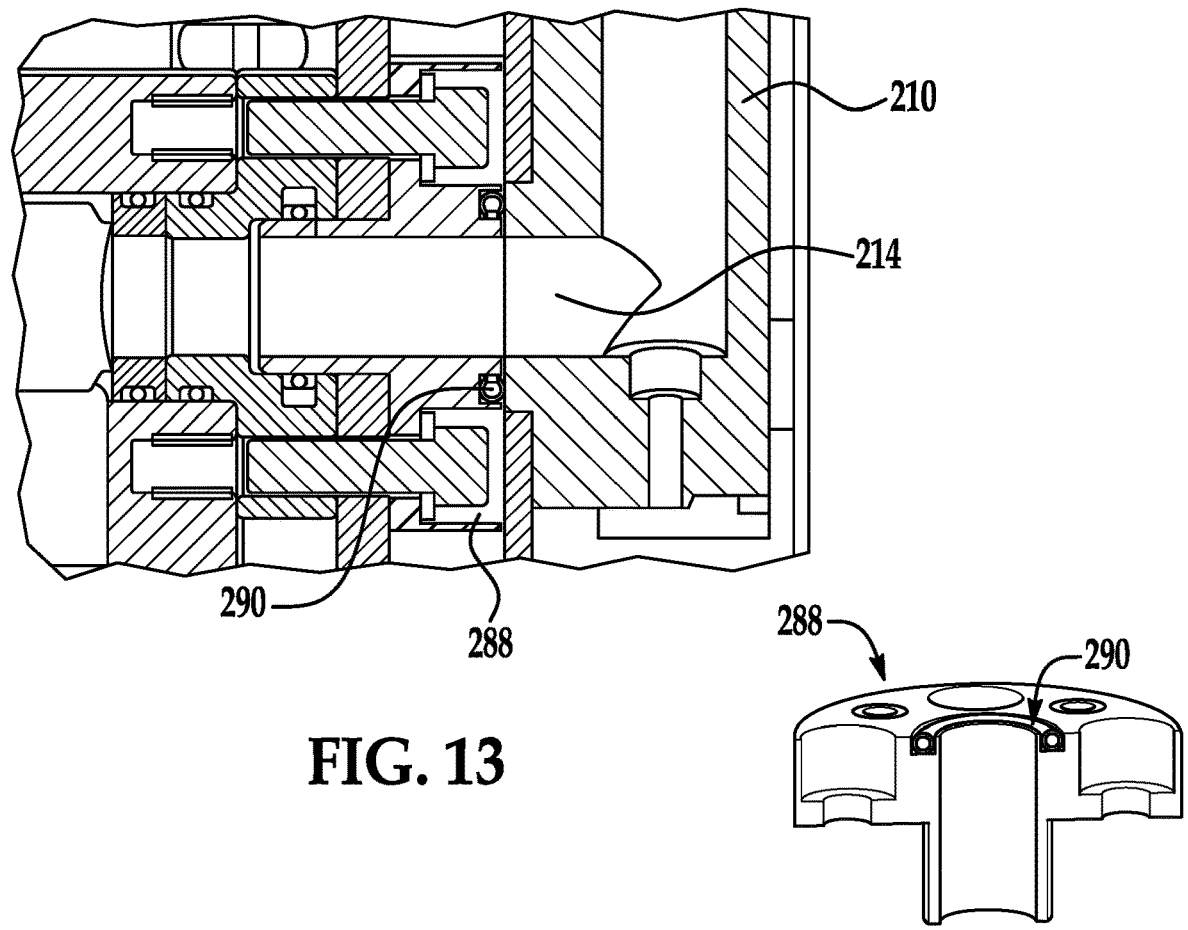
FIG. 13 is a side sectional view of a portion of the munitions rack, illustrating the pressurized gas connection.
Figure 14:
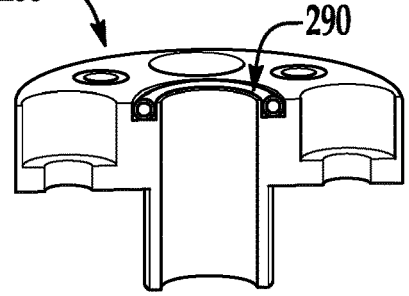
FIG. 14 is an oblique sectional view of a part of the pressurized gas connection, illustrating the seal for the connection.

Referring now to FIGS. 12-14, the connection is shown between the interface 214, part of the ejector 72, and gas-providing parts of the munitions rack 10 that are external of the ejector 72. The connection is made at an external interface 286 that is in fluid communication with the pressurized-gas source 92. The gas-providing parts include a capped tube 288 that has a metal gasket seal 290 that makes a seal with the interface 214. A series of eight screws are used in installing the ejector 72, with four screws used to couple a body 300 (FIG. 8) of the ejector 72 to the munitions rack structure 30, and another four screws used to couple the interface 214 and the capped tube 288, pulling the interface 214 tight against the capped tube 288, to engage the seal 290.

Referring now back to FIG. 9, the ejector 72 has a pair of hooks 302 and 304 that are used to hold the munition in place prior to release. The hooks are retracted to release the munition as part of the launch process. The ejector 72 may include a number of safety and release mechanisms, including mechanical, electrical, and/or electronic components, for controlling safe actuation of the ejector 72 to release and eject the munition. Such mechanisms may include, for example, hook latch locks and indicators 312 and 314, a position indicator 316, a solenoid 318, and a release mechanism lock 326.

What follows now are details of computer methods for integrating a platform such as an aircraft, stores such as munitions, and a munitions rack, such as described above. These methods may be embodiment in the systems control electronics 64 (FIG. 5) of the munitions rack 10 (FIG. 1). Further details regarding such methods and associated hardware/software may be found in U.S. Provisional Application 62/726,524, filed Sep. 4, 2018, which is incorporated by reference in its entirety.

A computer implemented method for integrating a platform, a store, and a carriage (or munitions) rack is implemented in software, firmware, and/or hardware of an electronic control module, which may also be referred to as a system control electronics (SCE) box, that is communicatively couplable to each of the platform, the store, and the carriage rack and configured to translate messages and other data between the components for integrating the components, such as in executing a particular mission. The electronic control module is a self-contained unit that is configured to support many different interfaces for platforms, mission stores, and carriage racks with minimal or no changes to the software.

The computer implemented method that is executed by the electronic control module includes using a software configuration file to define data or parameters corresponding to a plurality of predetermined electrical interfaces for predetermined platforms, stores, carriage racks, and different message sets that correspond to the platforms, stores, and carriage racks. The software configuration file is used to configure the parameters for a processor of the electronic control module that executes instructions for translating the messages or data between the different components.

The processor may then identify the electrical interfaces of the platform, different stores, and the carriage rack based on the parameters of the configuration file, receive and transmit different messages between the platform, the stores, and the carriage rack, and translate the messages for operation of the stores and the carriage rack. In exemplary configurations, the store or weapon may be the carriage rack. Operation of the stores and/or the carriage rack includes controlling timing, arming, firing, etc. based on the required control signals for a specific weapon and/or platform.

Using the software configuration file, the electronic control module is able to adapt to the interfaces of new platforms, armaments, or other mission specific parameters without having to develop new software for each platform and weapon integration combination. The message translator is coded on at least one circuit board, or a field-programmable gate array (FPGA), and at least one microprocessor that are contained within the electronic control module. In an exemplary embodiment, the electronic control module may include two circuit boards and two microprocessors, with one of the microprocessors being able to be powered off for performing different functions. The processors may be arranged on the same or different electronic boards. The electronic control module may also be used in platform simulation and testing of the store and/or the carriage rack for integrating the store with the platform prior to operation, debugging the software, and/or verifying the component.

Figure 15:
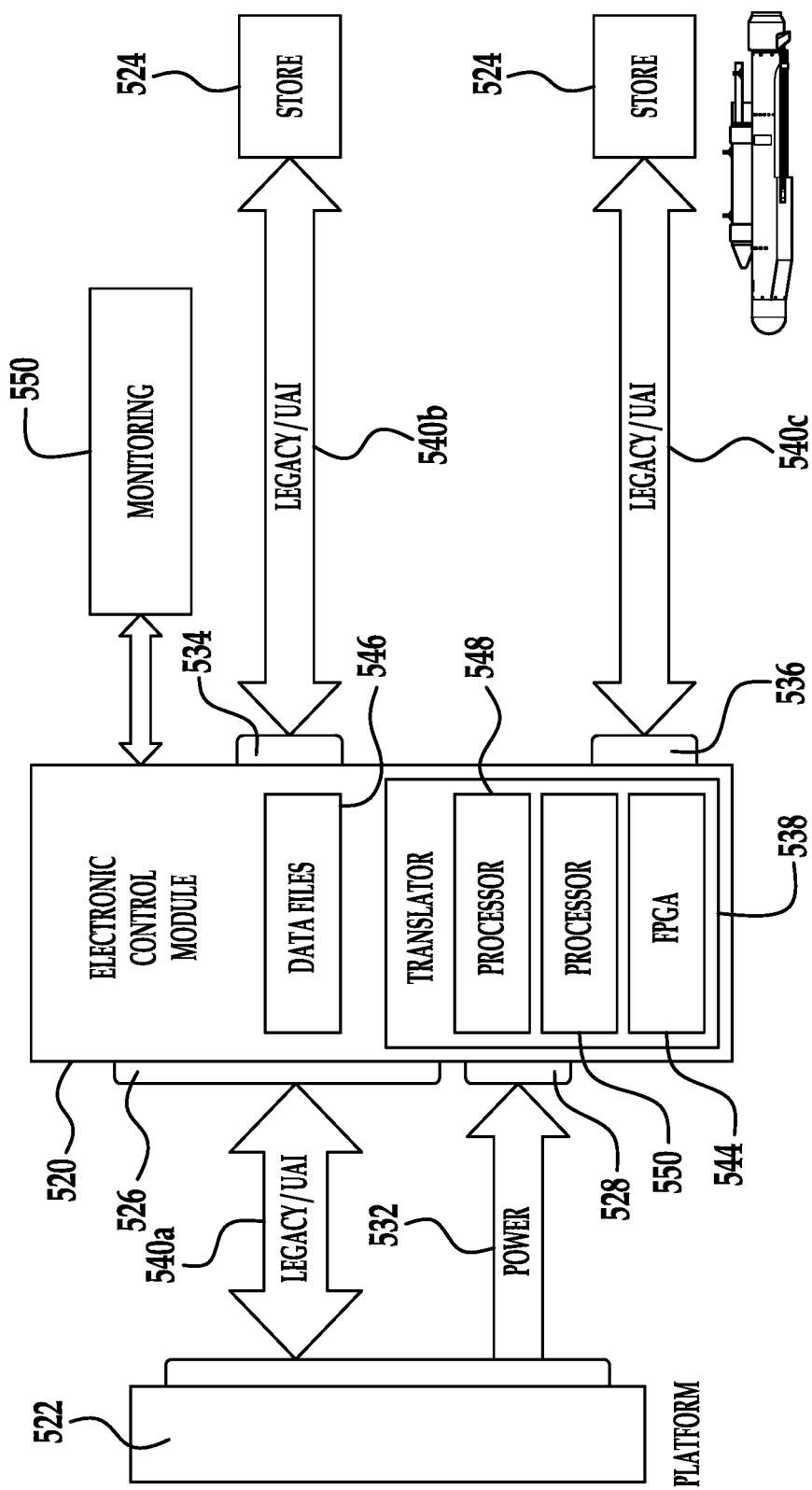
FIG. 15 shows a schematic drawing of an electronic control module for integrating a platform and a store, for use for example in a munitions rack such as the munitions rack of FIGS. 2-7.

Referring to FIG. 15, a schematic drawing of an electronic control module 520 for integrating a platform 522 and a store 524 is shown. The electronic control module 520 is communicatively coupled between the platform 522 and the store 524 and may be arranged on the platform 522 or the store 524. The store 524 may include any device that is intended for internal or external carriage and mounted on suspension and release equipment of the platform 522, whether or not the item is intended to be separated during operation of the platform 522. The store 524 may be an expendable store that is separated from the platform during operation. Exemplary expendable stores include missiles, rockets, bombs, nuclear weapons, mines, torpedoes, pyrotechnic devices, sonobuoys, signal underwater sound devices, or other similar items. In other applications, the store 524 may be a nonexpendable store that is not separated from the platform during operation. Exemplary nonexpendable stores include tanks (e.g., fuel and spray), line-source disseminators, pods (e.g., refueling, thrust augmentation, gun, electronic attack, data link), multiple racks, targets, cargo drop containers, drones, or other similar items. The electronic control module 20 may be communicatively coupled with a plurality of stores and any suitable number of stores may be used. Using the electronic control module 520 enables integration between any of the aforementioned stores and the platform 522.

The platform 522 and the store 524 each use predetermined messages and interface protocols and the interfaces of the platform 22 and the store 24 may be different. The platform 522 may use military standard-1760 (MIL-STD-1760) precision guided munitions (PGM) mission store and/or a MIL-STD-1553B aircraft interface. The platform interfaces may be referred to as legacy interfaces that refer to any currently existing system. Legacy to legacy refers to the interface between any existing platform and any existing weapon. Not all platforms carry or interface with all weapons and each weapon has its own unique interface (communication protocol, timing, and sometimes electrical). For example, an F-16 aircraft platform may have a standard set of weapons with which it interfaces. The electronic control module 20 may be used to add a legacy weapon and communicate between the existing F-16 OFP and the unique interface on the legacy weapon such that the F-16 OFP is not affected or changed. In contrast, conventional integration required changing the OFP of the platform which is expensive due to the required certifications.

The MIL-STD-1760 PGM mission store may include Guided Bomb Unit-31/32/38 (GBU-31/32/38) Joint Direct Attack Munitions (JDAM), Air-to-Ground Missile-154 (AGM-154) Joint Standoff Weapon (JSOW); Enhanced GBU-24/27/28 (EGBU-24/27/28) Enhanced PAVEWAY, Cluster Bomb Unit-103 (CBU-103), CBU-104, or CBU-105 Wind Corrected Munitions Dispensers (WCMDs), Air-launched Decoy Missile-160B/C (ADM-160B/C) Miniature Air Launched Decoy (MALD), or AGM-158 Joint Air-to-Surface Stand-Off Missile (JASSM). The message format (i.e., legacy (non-UAI) format) for a MIL-STD-1760 PGM mission store can use message structures and definitions conforming to a legacy weapon Interface Control Document (ICD). Many other examples may be suitable.

The store 524 may implement a Universal Armament Interface (UAI) which is a logical or messaging interface allowing for a standardized message structure for various modern weapons and platforms, such as an aircraft. In other exemplary embodiments, the store 524 may be a miniature munition, such as a small diameter bomb which uses an Enhanced Bit Rate-1553 (EBR-1553) protocol. The small munitions may mount to a multi-position carriage system. The electronic control module 20 provides interface translation between the platform 522 and the store 524, and control of the store 524, e.g., during carriage and release or ejection. Exemplary carriage platforms include the bomb release unit-55 (BRU-55) (used by the U.S. Department of the Navy (DoN)) and allows carriage of two smart weapons (e.g., dual weapon up to 1000 lb class) on a single aircraft platform), BRU-33 (dual weapon carriage used by the U.S. Marines), BRU-57 (dual weapon carriage used by the U.S. Air Force (USAF)), munitions armament unit-46 (MAU-46), BRU-71/A, smart bomb rack assembly (SBRA) (including 20 weapons), or heavy stores adapter beam (HSAB) (including 9 weapons for external munitions on USAF B-52H). Many other examples may be suitable.

The electronic control module 520 includes interfaces 526, 528 (e.g., platform interfaces) that are configured for communication with the platform 522. Any number of platform interfaces 526, 528 may be provided on the electronic control module 520. The platform interfaces 526, 528 may include a message interface, such as a legacy interface, and/or a remote terminal, such as a MIL-STD-1553 as an interface on the platform side of the electronic control module 520. One of the interfaces 526, 528 may be configured to receive power 532 from an external power source, i.e. a power source of the platform 522. For example, the power source may be a 28V DC power supply.

The electronic control module 520 further includes interfaces 534, 536 (e.g., platform interfaces) that are configured for communication with at least one store 524. The interfaces 534, 536 and communication between the electronic control module 520 and each store 524 is independent from the platform interfaces and communication between the electronic control module 520 and the platform 522. The interfaces 534, 536 may include bus controller interfaces such as a MIL-STD-1553 bus controller or EBR-1553 bus controller or other interfaces such as RS-422/485, CAN Bus, or Ethernet. The electronic control module 520 includes a built-in interface translator 38 to provide message translation, logical translation, or data manipulation between the platform interfaces and the store interfaces. As shown in FIG. 15, the translator 538 is configured for translating messages 540a with the platform 522, messages 40b with one of the stores 524, and messages 540c with another one of the stores 524.

When the electronic control module 520 receives information from the platform 522, such as a message, the translator 538 is used to translate the information to be sent to and received by the store 524. For example, the platform 522 may include a MIL-STD-1553 (or MIL-STD-1760) bus controller for sending legacy messages to the store 524 and receiving legacy messages from the store 524. Similarly, the store 524 may use UAI messages to the platform and receiving messages from the platform. Thus, the translator 538 may operate as a MIL-STD-1760 (e.g., MIL-STD-1553) remote terminal for the platform and as a MIL-STD-1553 or an EBR-1553 bus controller for the store 524 by providing message layer translation, or logical layer translation, between the legacy interface and the UAI. The translator 538 may convert the legacy message interface on the remote terminal platform side to the UAI message interface on the store bus controller side. The translator 538 may also convert the UAI message interface on the bus controller side to the legacy message interface on the remote terminal platform side. The translator 538 may provide translation for the store 524. For example, the translator 538 may provide MIL-STD-1553B to EBR-1553 translation for the store 524.

Software pertaining to the translator 538 may be coded on a computer readable storage medium, which may be included in an FPGA, and/or coupled to at least one microprocessor. In an exemplary embodiment, the electronic control module 520 may include two circuit boards and two microprocessors. The software may be configured using a data file or a software configuration file 546, such as a mission data file. The mission data file 546 may be arranged in the electronic control module 520 and is used to transport parameters corresponding to specific platforms, stores, carriage racks, and/or mission-specific programming data. Exemplary parameters include powering-up parameters, release parameters, timing parameters, firing parameters, etc. The microprocessors 548, 550 of the electronic control module 520 are then configured to execute a set of instructions for translation based on the data of the mission data file 546. Using the mission data file 546 is advantageous in that the file may be updated to accommodate future configurations of platforms and stores without changing the software executed by the processor.

The translator 538 and the electronic control module 520 enables the store to be integrated onto the platform in various weapon release systems including air-to-air systems, air-to-ground systems, ground-to-ground systems, or ground-to-air systems. In an exemplary application, a UAI store 524 (e.g., SDB-II) may be integrated onto the platform 520 that implements a legacy MIL-STD-1760 messaging interface for an air-to-ground weapon (e.g., a JDAM weapon that is a legacy weapon or an Enhanced PAVEWAY) and provides a logical interface between the weapon and the aircraft platform. The translator 538 may be implemented in software, firmware, or hardware and runs on the processor 548, 550 to shift and/or recalculate data elements to perform the interface translation. The interface translation may be platform or weapon specific and the translator 538 may adjust to a specific platform based on a received platform identifier message that is determined by the processor 548, 550. Using the message translator enables the electronic control module to communicate different messages between the platform, the different stores, and the carriage rack without affecting or having to change the Operational Flight Program (OFP) of the platform.

In addition to message translation, the electronic control module 520 is also configured to manage and control operation of the carriage rack and the store 524, as compared with conventional methods in which the OFP for operating the store was arranged on the platform. For example, the electronic control module 520 may be configured to perform a monitoring function 550 in which the electronic control module 520 monitors an arm and release status of the store 524. The managing function of the electronic control module 520 is enabled by communicating with the platform 522 and the store 524 on separate and independent busses.

Figure 16:
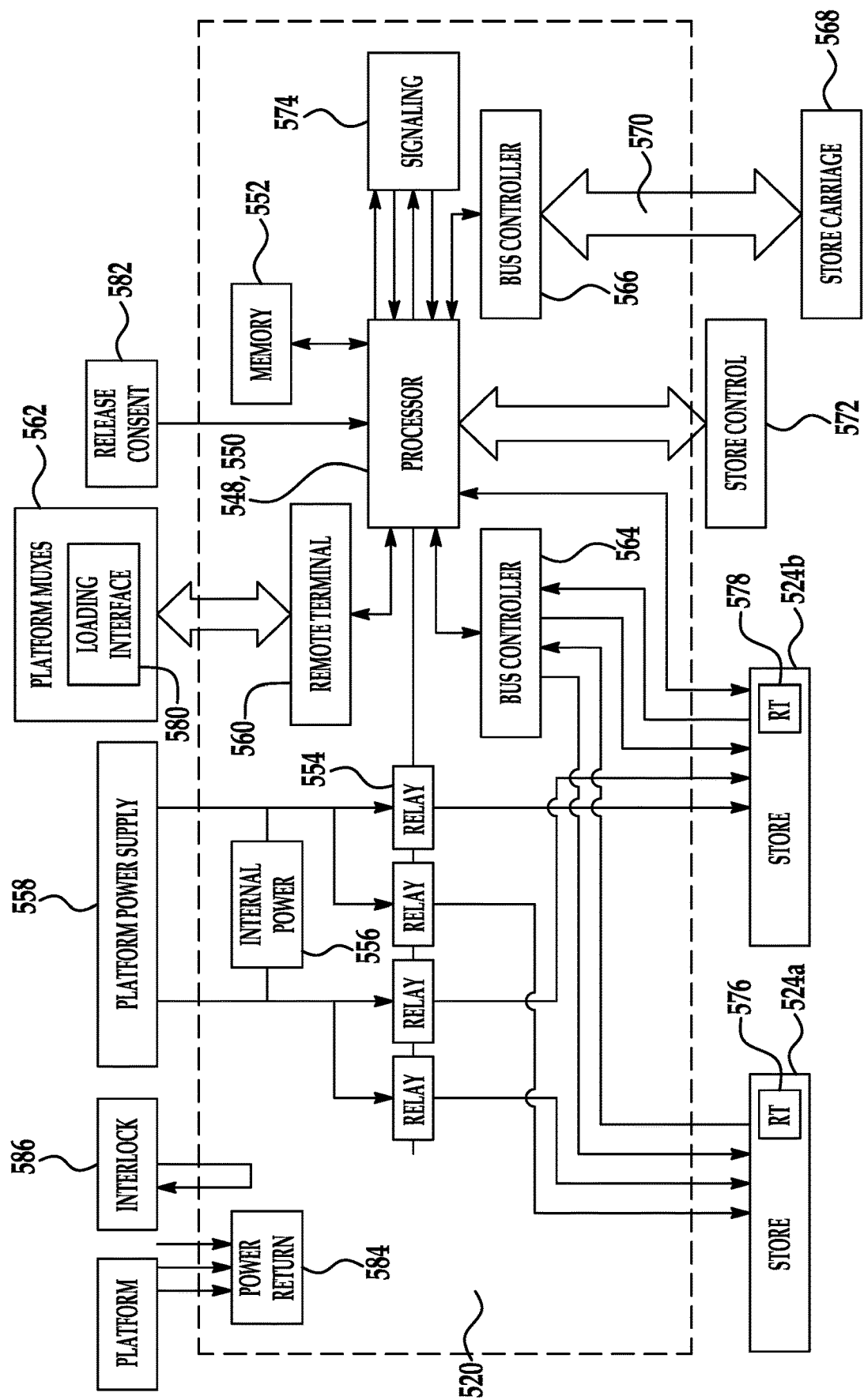
FIG. 16 shows a schematic drawing of a logical architecture of the electronic control module of FIG. 15.
Figure 17:
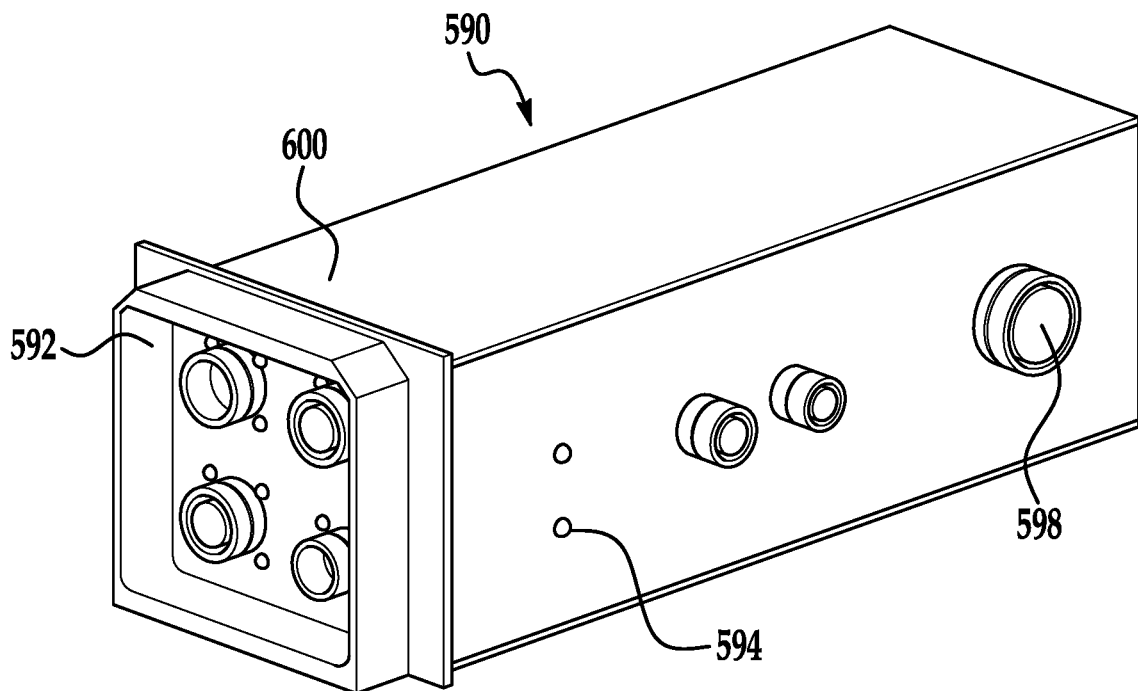
FIG. 17 shows an oblique view of a first side of a housing for the electronic control module of FIG. 15.

FIG. 16 shows a logical architecture of the electronic control module 520 according to an exemplary embodiment. The electronic control module 520 includes the processor 548, 550, a memory 552 communicatively coupled to the processor 548, 550, and/or an FPGA and a relay set 554 communicatively coupled to the processor 548, 550. An internal power supply 556 is arranged in the electronic control module 520 and connectable to a platform power supply 558. A remote terminal 560 is communicatively coupled between at least one platform multiplexer 562 of the platform and the processor 548, 550. Weapon side bus controllers 564, 566 are also communicatively coupled to the processor 548, 550. One of the bus controllers 564 is communicatively coupled to at least one store 524a, 524b and the other bus controller 566 is communicatively coupled to an existing store carriage 568. Operation of each store 524a, 524b may be managed independently.

In an exemplary embodiment, the bus controller 564 may be a MIL-STD-1553 bus controller communicatively coupled between the processor 548, 550 and the store 524a, 524b, and the bus controller 566 may be a EBR-1553 bus controller communicatively coupled between the processor 548, 550 and the existing store carriage 568. The store carriage 568 may be a single carriage or a dual carriage, or a four-place carriage, such as a BRU. The existing store carriage 568 may include circuitry 570 such as a joint miniature munitions interface (JMMI)-BRU circuits and stations. Advantageously, the electronic control module 520 is suitable for use with a Type I Carriage System, i.e. a dumb-rack "pass-through" carriage, or a Type II Carriage System in which all of the weapons may be managed and up/down translation with the platform may occur.

The processor 548, 550 is further configured to provide store control 572 and signaling 574 for the stores 524a, 524b. For example, the processor 548 may be configured to provide a release command and an arm command to the store 524a, 524b based on receiving other data from the platform or the carriage rack. Remote terminals (RTs) 576, 578 may be arranged in the stores 524a, 524b.

The processor 548, 550 is also configured for communication with a loading interface 580 for the software configuration files 546 (shown in FIG. 15). The loading interface 580 is arranged on the platform multiplexer 562 and may be configured for the mission data files for transporting mission-specific data and configuring the processor 548, 550. Each mission data file may include a capability for a specific weapon or store. A plurality of mission data files may be provided for different weapon capabilities. Accordingly, the electronic control module 520 is configured to download the mission data files and may be configured to convert the mission data files into another mass data transfer (MDT) format. For example, the processor 548, 550 may convert the mission data files into MIL-STD-1760 MDT format. Advantageously, data does not need to be pre-loaded and the data can be transferred on the platform during flight.

The processor 548, 550 is further configured to receive release consent data 582 from the platform, e.g. a pilot's authorization or signal to fire the store 524a, 524b, such that the processor 548, 550 may use the release consent data 582 to control a release sequence of the stores 524a, 24b. As shown in FIG. 16, the busses between the electronic control module 520 and the other components of the launch system are independent from each other which enables the management and control of the store operation. The electronic control module 520 may include a power return function 584 and an interlock device 586 for providing an interlock function as will be described further below.

The processor 548, 550 may also be configured to perform other functions during operation of the platform and the store. For example, the processor 548, 550 may be configured to determine a composite launch acceptability region. If the processor 548, 550 includes two microcontrollers, one of the microcontrollers may be used to perform this specific function. Telemetry communication may be performed using the processor 548, 550. The telemetry communication may be used for sending flight parameters to the ground. Still another function of the electronic control module 520 may be to perform UAI certification of a weapon interface during integration. The processor 548, 550 may be configured to determine that at least one of the electrical interfaces of the store is a UAI based on the known data corresponding to the UAI.

Prior to executing a mission, the electronic control module 520 may also be used in testing and verification of the store and other components. For example, the electronic control module 520 may be coupled to test equipment, such as a control computer to simulate a platform's bus controller and verify the interface translator and legacy interface remote terminal functionality. Legacy to legacy message translation or legacy to UAI message translation may be verified. A bus controller may be coupled to the test equipment to simulate a store carriage's remote terminal and verify the interface translator and the bus controller functionality. The simulator may include a power simulator and an ejector simulator. A computer may be used for debugging and downloading code to the electronic control module 520.

Figure 18:
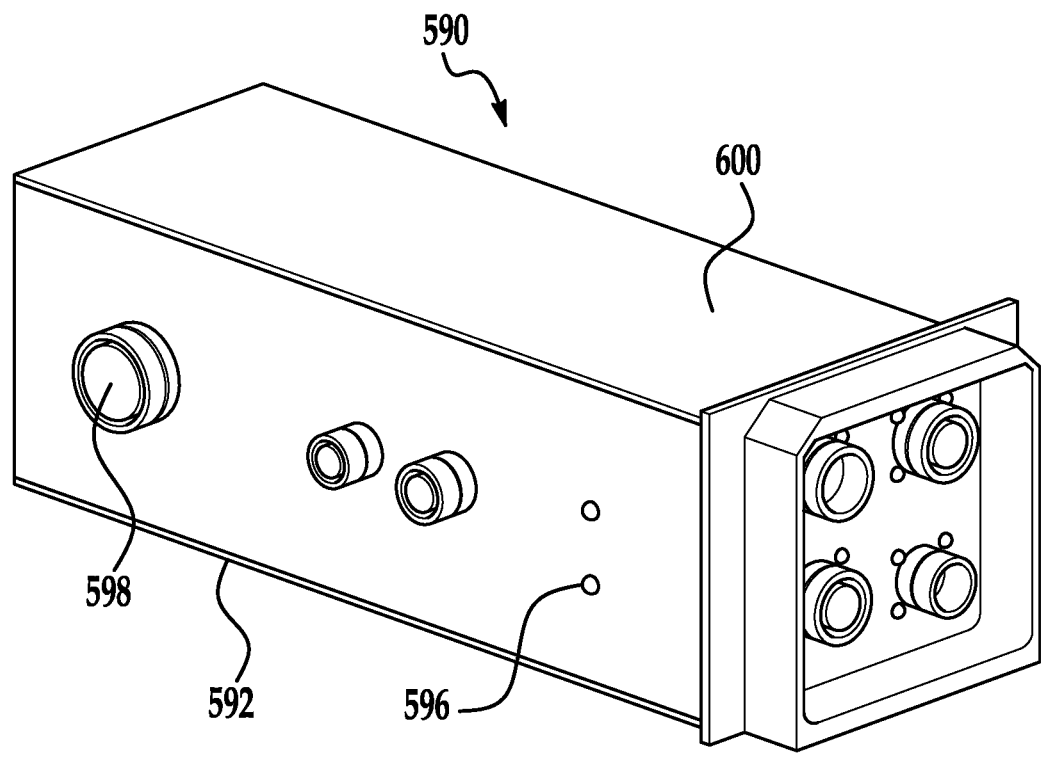
FIG. 18 shows an oblique view of a second side of the housing of FIG. 17.
Figure 19:
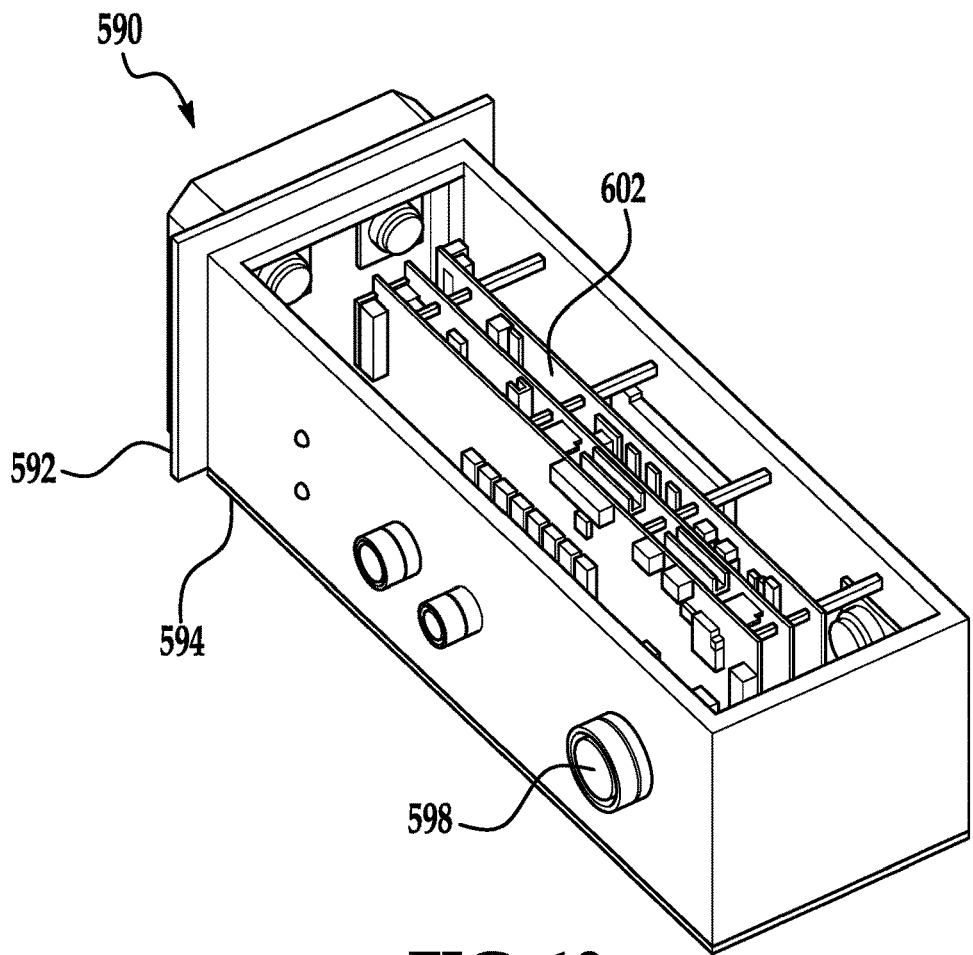
FIG. 19 shows an oblique view of electronics contained within the housing of FIG. 17.

FIGS. 17-21 show a control electronics (SCE) enclosure or box 590 for the electronic control module 520. The SCE box 90 includes a housing 592 for the electronics that includes various external interfaces for connection with different platforms, stores, and carriage racks, such that the SCE box 590 is modular. For example, the SCE box 590 may include at least one store indicator 594 for indicating an arming or firing command for the store. In an exemplary embodiment, the indicator 594 may be a light-emitting diode (LED). A first side of the housing 592 may include an indicator 594 for one of the stores and another side of the housing 592 may include an indicator 596 for another store. The housing 592 may be rectangular in shape or have any other suitable shape that will be dependent on the application, and/or whether the SCE box 590 is arranged on the platform or the weapon. For example, a 1760 interface connector 598 may be provided. Various platform connectors may also be provided on the housing 592. As shown in FIGS. 18 and 19, when installed for operation, the SCE box 590 may include a cover 600 for enclosing the electronics housed within the SCE box 590.

Figure 20:
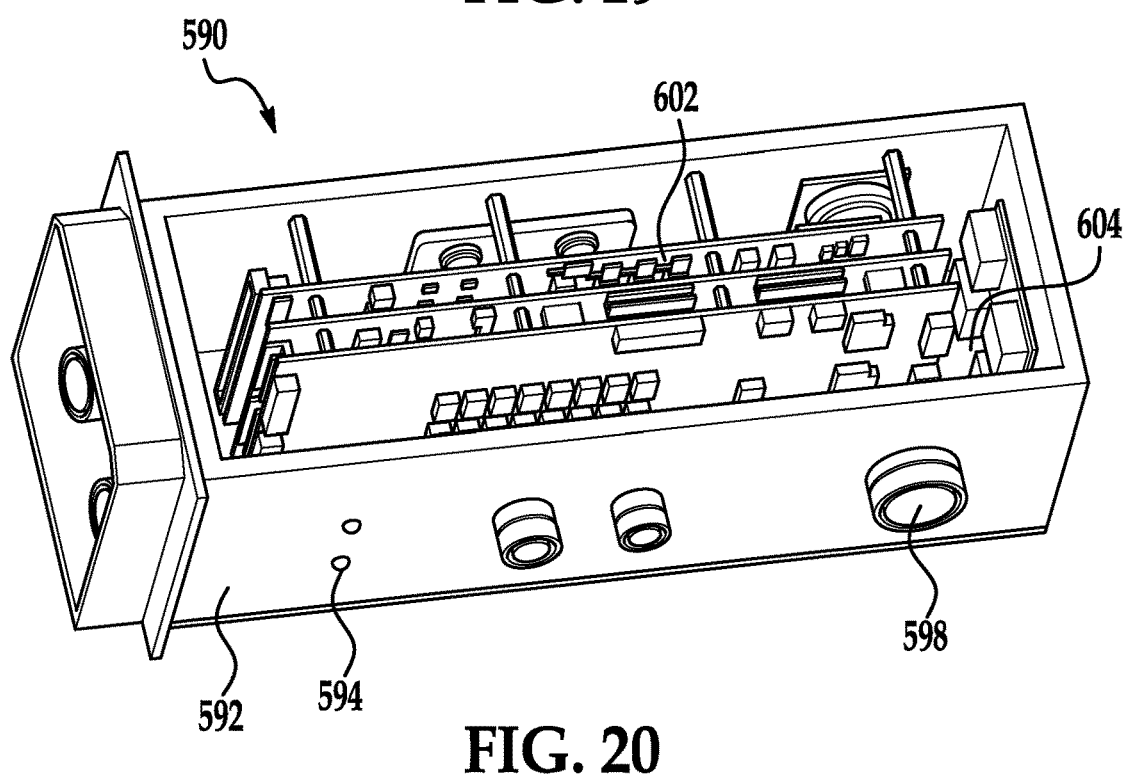
FIG. 20 shows another oblique view of the electronics contained within the housing of FIG. 17.
Figure 21:
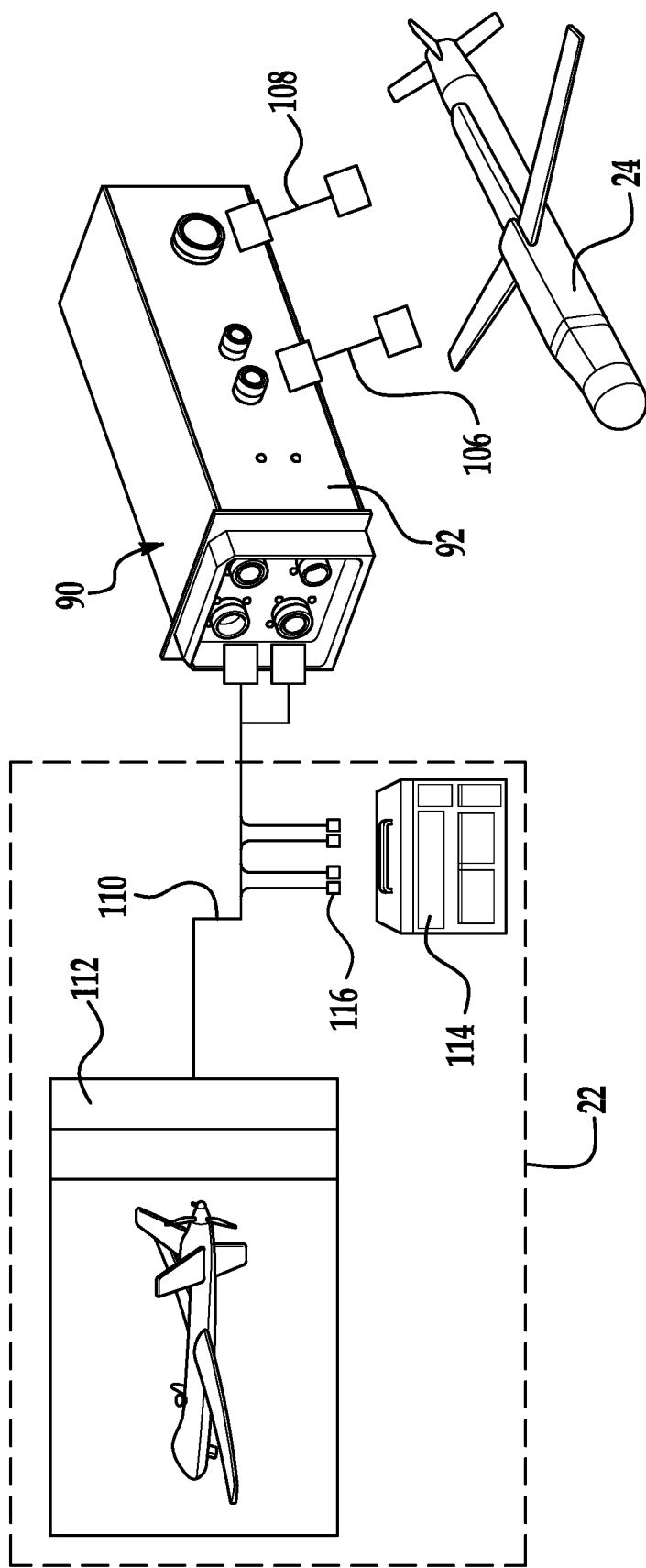
FIG. 21 shows a schematic drawing of a wire harness configuration for the housing of FIG. 17 with the platform and the store.

FIGS. 19 and 20 show the electronics housed in the SCE box 590. At least one circuit card 602, or FPGA, and a power relay set 604 is provided. With further reference to FIG. 21 which schematically shows connections to the SCE box 590, the electronics may include any suitable wire harnesses between the SCE box 590 and the platform 522 or the store 524. In an exemplary embodiment, a JMMI/BRU umbilical 606 and a straight 1760 extension 608 may be connected between the SCE box 590 and the store 24. The straight 1760 extension 608 may be connected between the SCE box 590 and the weapon 524, 524a, 524b (also shown in FIG. 15). A wire harness 610 may also be connected between the SCE box 590 and a 1760 interface 612 of the platform 522. In an exemplary embodiment, a power supply 614 may be arranged on the platform 22 for supplying remote power to the SCE box 590.

Figure 22:
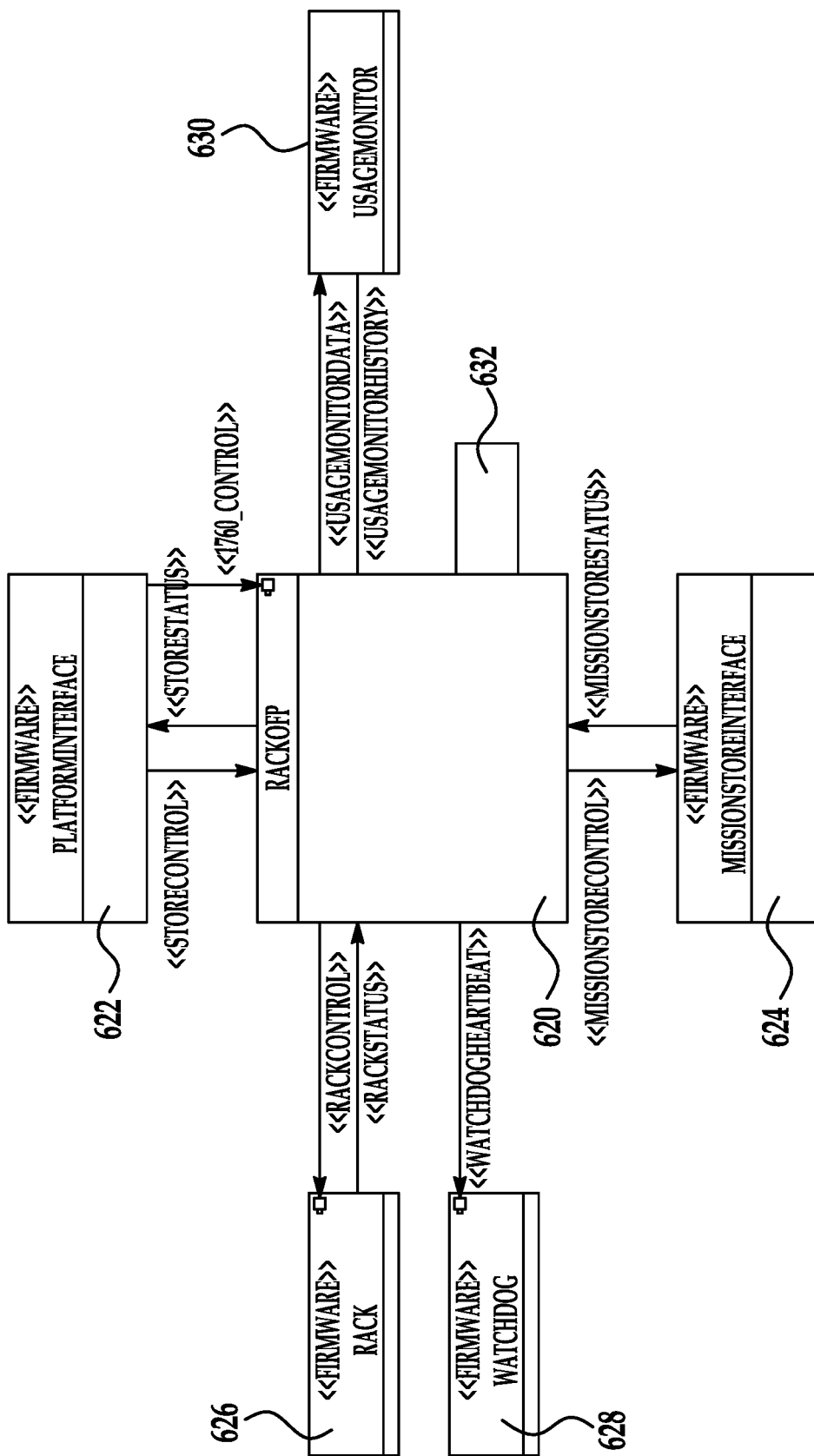
FIG. 22 shows a software architecture for the electronic control module of FIG. 15.
Figure 23:
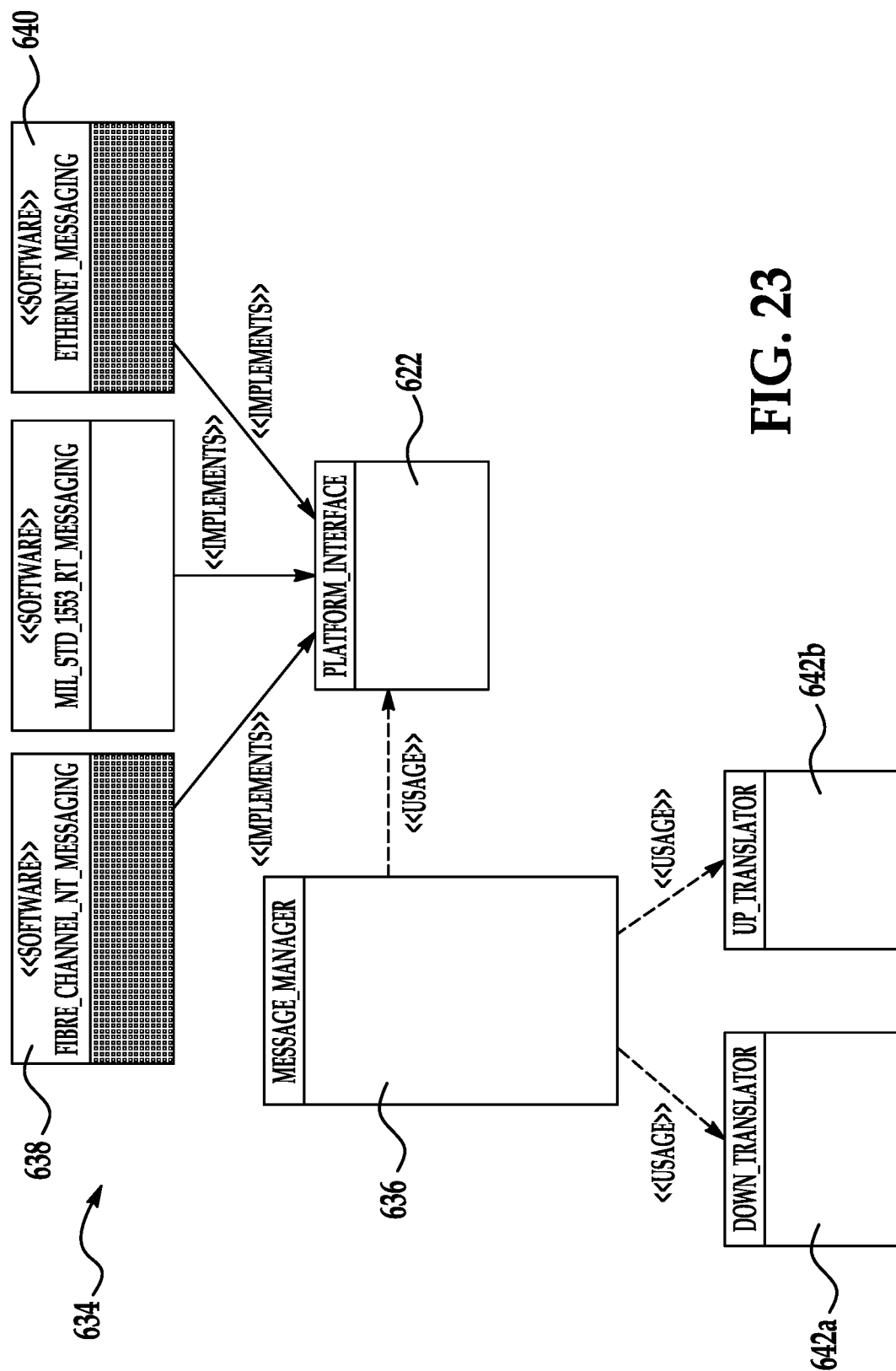
FIG. 23 shows a software architecture for a message manager interface of the electronic control module of FIG. 22.
Figure 24:
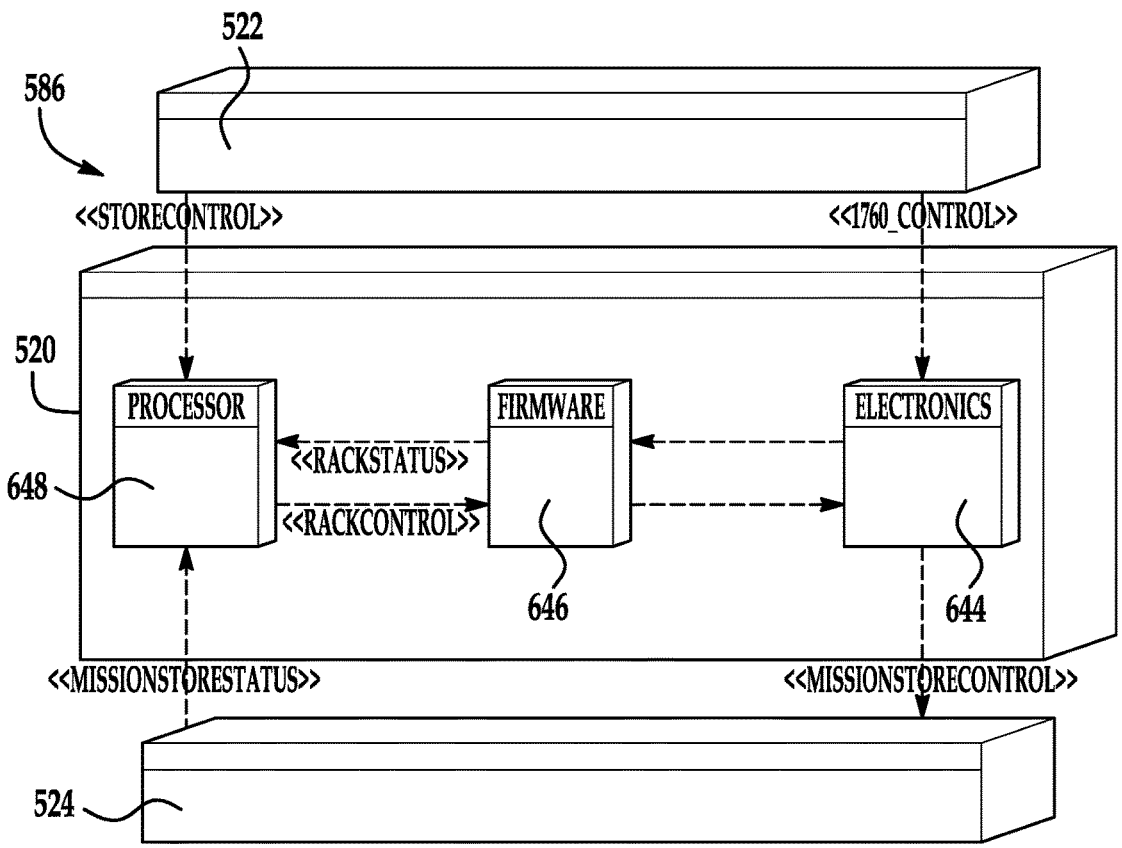
FIG. 24 shows a software architecture for a safety interlock device of the electronic control module of FIG. 22.

FIGS. 22-24 show exemplary architectures for the computer implemented method performed by the electronic control module 520/SCE box 590 as previously described. As shown in FIG. 22, the architecture includes a Rack OFP 620 that includes the software, the message translator, and a bus controller manager. The architecture further includes a platform interface 622 that handles the store control and status messages to and from the platform, a mission store interface 624 that controls the mission store control and status messages to and from the Rack OFP 620, a rack interface 626 that controls and monitors the power, discretes, and statuses of the hardware for the SCE box 590, a monitoring interface 628 that monitors tasks being performed by the Rack OFP 620, and a usage monitor interface 630 that controls the interfaces for logging and retrieving fault data and events to and from the FPGA and the memory. Using the SCE box 590 enables addition of new platform components or new weapon configurations using the UAI standard without changing or modifying the software. New functions may be added using additional feature sets that are added to existing partitions on the circuit cards or by adding an Extended Function Module 632 for enabling new interfaces. For example, fiber channel or ethernet communications may be enabled.

In an exemplary embodiment, the platform interface 622 may be a MIL-STD-1760 interface with the platform as the bus controller and the Rack OFP 620 as the remote terminal. The platform interface 622 may include other interfaces. The mission store interface 624 may include MIL-STD-1760 with MIL-STD-1553B, with the OFP being the bus controller and the OFP will support an EBR-1553 interface.

With further reference to FIG. 23, the Rack OFP 620 includes a message manager 634 having an interface 636 that interfaces with the platform messaging interface 622. The message manager 634 is configured to route messages based on the message type and handle incoming messages from internal components. The message manager interface 636 may be modular which enables the hardware interface to change without impacting the rest of the software. Using the message manager interface 636 may enable support of other messaging interfaces such as a fiber channel interface 638 or an ethernet interface 640 (or RS-422/485, CAN, etc.). The message manager 634 is configured as both a down translator 642a and an up translator 642b for communication between the Rack OFP 620 and the platform. Using the up and down translators 642a, 642b enables the message manager 634 to handle additional interfaces without impacting the software. The weapon side of the electronic control module 20 also includes up and down translators. The message manager 634 may be configured to store messages based on the message type and source and route messages to multiple recipients.

Referring now to FIG. 24, an architecture for an interlock device 86 (also shown in FIG. 16) of the electronic control module 520 is shown. The interlock function uses electronics 644, the FPGA 646, and the software executed by the processor to release the store 524. The electronics 644 may use required control signals from the platform 522 and the release consent data 582 to activate the release circuits for the store 524 (shown in FIG. 16). The FPGA 646 and software independently verify that the signals are present before, up to, and during the release sequence for the store 524. The FPGA 646 may also verify an ejector status. If the electronic signals are lost at any point during the release sequence, the release sequence may be halted or aborted by the electronic control module 520. The software may be used to perform safety checks on the hardware for the power supply, the release consent, and the release mechanism or ejector. Using the architecture is advantageous in providing a three-way safety check. Accordingly, arming is able to be performed immediately before launch as compared with conventional systems which only enable arming to be performed on the ground. Using the electronic control module 520 is advantageous in that the required control signals may be different for each weapon or store such that the electronic control module 20 may control any weapon or store.

Figure 25:
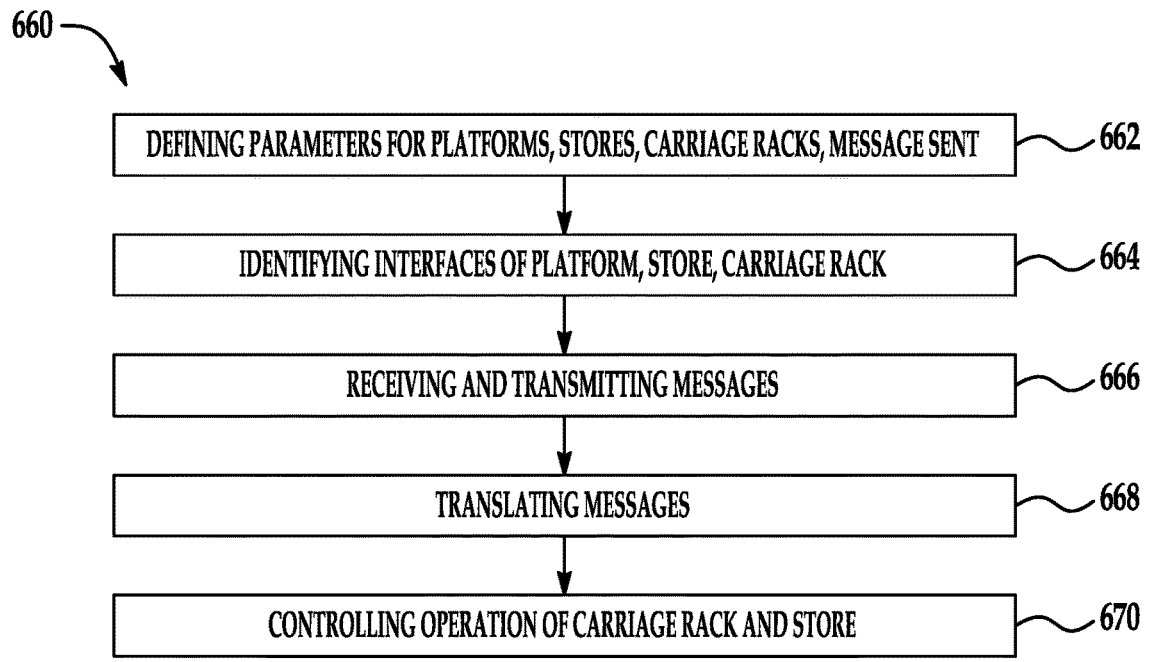
FIG. 25 shows a flowchart of a computer-implemented method for integrating the platform and the store of FIG. 15.

Referring now to FIG. 25, a flowchart illustrating a computer implemented method 660 for integrating a platform, a store, and a carriage rack is shown. The method 660 may be implemented in software, firmware, and/or hardware of the electronic control module 20/SCE box 590 as described herein. Step 662 of the method includes defining the parameters for a plurality of predetermined electrical interfaces for different platforms, different stores, different carriage racks, and different message sets that correspond to the different platforms, stores, and carriage racks. Step 662 may include using a configuration file. Step 664 of the method 660 includes identifying electrical interfaces of the platform, the store, and the carriage rack based on the defined parameters. Step 664 may include using a processor of the electronic control module described herein that has an application or software that is pre-configured by the configuration file.

Step 666 of the method 660 includes receiving and transmitting different messages between the platform, the store, and the carriage rack. Communication may be performed by the processor and the communication with each of the platform, the store, and the carriage rack is independent relative to communication with another one of the platform, the store, and the carriage rack. Step 668 of the method 660 includes translating messages, if necessary, between the platform and the store. Step 668 may include using a built-in translator of the electronic control module. Step 670 of the method 660 includes controlling operation of the carriage rack and the store, such as release operations.

Various techniques described herein may take the form of program code (i.e., instructions) embodied in tangible media, such as floppy diskettes, compact disc-read-only memory (CD-ROMs), digital versatile disc (DVD), hard drives, non-transitory computer readable storage medium, or any other machine-readable storage medium. When the program code is loaded into and executed by a machine, such as a computer, the machine becomes an apparatus for practicing the various techniques. Circuitry may include hardware, firmware, program code, executable code, computer instructions, and/or software. A non-transitory computer readable storage medium nay be a computer readable storage medium that does not include signal. In the case of program code execution on programmable computers, the computing device may include a processor, a storage medium readable by the processor (including volatile and non-volatile memory and/or storage elements), at least one input device, and at least one output device.

The volatile and non-volatile memory and/or storage elements may be a random-access memory (RAM), erasable programmable read only memory (EPROM), flash drive, optical drive, magnetic hard drive, solid state drive, or other medium for storing electronic data. The interface bridge device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

The functional unit described in this specification has been labeled as a module which may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like. The module may also be implemented in software for execution by various types of processors. An identified module of executable code may, for instance, comprise one or more physical or logical blocks of computer instructions, which may, for instance, be organized as an object, procedure, or function. The executables of an identified module need not be physically located together, but may comprise disparate instructions stored in different locations which, when joined logically together, comprise the module and achieve the stated purpose for the module.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A munitions rack comprising:
    a munitions rack structure including a pair of longitudinal ribs defining a longitudinally-extending central recess and a pair of longitudinal-extending side recesses on opposite respective sides of the longitudinally-extending central recess, with the longitudinal ribs between the longitudinally-extending central recess and respective of the longitudinally-extending side recesses;
    munitions ejectors insertable into and securable to the munitions rack structure, wherein multiple of the munitions ejectors are in each of the side recesses; and
    one or more pressurized gas sources in the munitions rack structure and outside the munitions ejectors;
    wherein the munitions ejectors each have a pressurized gas interface for receiving pressurized gas from the one or more pressurized gas sources, when the munitions ejectors are inserted into the munitions rack structure.

2. The munitions rack of claim 1, wherein the one or more pressurized gas sources includes respective pressurized gas sources corresponding to individual of the munitions ejectors.

3. The munitions rack of claim 1, wherein the munitions ejectors are covered by external lateral ribs of the munitions rack structure, with the external lateral ribs constituting parts of an outer skin of the munitions rack structure.

4. The munitions rack of claim 3, wherein the external lateral ribs are linked by a spine of the munitions rack structure, with the spine being a top of the outer skin, and the external lateral ribs constituting opposite sides of the outer skin.

5. The munitions rack of claim 1, further comprising an air compressor in the munitions rack structure, wherein the air compressor provides pressurized gas to the one or more pressurized gas sources.

* * * * *